US009493640B2

(12) United States Patent
Cernohous et al.

(10) Patent No.: US 9,493,640 B2
(45) Date of Patent: Nov. 15, 2016

(54) WOOD PLASTIC AND THERMOPLASTIC COMPOSITES

(71) Applicant: TerraVia Holdings, Inc., South San Francisco, CA (US)

(72) Inventors: Jeffrey J. Cernohous, Hudson, WI (US); Adam R. Pawloski, Lake Elmo, MN (US); John Piechocki, South San Francisco, CA (US); Adrienne McKee, South San Francisco, CA (US)

(73) Assignee: TerraVia Holdings, Inc., South San Francisco, CA (US)

( * ) Notice: Subject to any disclaimer, the term of this patent is extended or adjusted under 35 U.S.C. 154(b) by 0 days.

(21) Appl. No.: 14/213,950

(22) Filed: Mar. 14, 2014

(65) Prior Publication Data

US 2014/0275355 A1 Sep. 18, 2014

Related U.S. Application Data

(60) Provisional application No. 61/792,272, filed on Mar. 15, 2013, provisional application No. 61/839,813, filed on Jun. 26, 2013, provisional application No. 61/879,525, filed on Sep. 18, 2013.

(51) Int. Cl.
*C08L 23/06* (2006.01)
*C08L 23/12* (2006.01)
*C08L 97/02* (2006.01)
*C08L 99/00* (2006.01)

(52) U.S. Cl.
CPC ............. *C08L 23/06* (2013.01); *C08L 23/12* (2013.01); *C08L 97/02* (2013.01); *C08L 99/00* (2013.01); *C08L 2205/16* (2013.01)

(58) Field of Classification Search
CPC ...... C08L 23/206; C08L 23/12; C08L 97/02; C08L 99/00
USPC .................. 524/35; 264/328, 175, 328.1
See application file for complete search history.

(56) References Cited

U.S. PATENT DOCUMENTS

| 2,639,239 | A | 5/1953 | Elliott |
| 3,345,358 | A | 10/1967 | Adam |
| 3,723,413 | A | 3/1973 | Chatterjee et al. |
| 3,795,670 | A | 3/1974 | Mark et al. |
| 4,000,127 | A | 12/1976 | Cornelissens et al. |
| 4,689,408 | A | 8/1987 | Gelman et al. |
| 5,288,318 | A | 2/1994 | Mayer et al. |
| 5,352,709 | A | 10/1994 | Tarrant et al. |
| 5,367,003 | A | 11/1994 | Petcavich |
| 5,607,551 | A | 3/1997 | Farrington, Jr. et al. |
| 5,654,103 | A | 8/1997 | Troadec |
| 5,779,960 | A | 7/1998 | Berlowitz-Tarrant et al. |
| 5,910,545 | A | 6/1999 | Tsai et al. |
| 5,939,467 | A | 8/1999 | Wnuk et al. |
| 6,027,611 | A | 2/2000 | Mcfarland et al. |
| 6,177,193 | B1 | 1/2001 | Tsai et al. |
| 6,323,307 | B1 | 11/2001 | Bigg et al. |
| 6,765,042 | B1 | 7/2004 | Thornton et al. |
| 7,393,590 | B2 | 7/2008 | Scheer et al. |
| 7,485,719 | B2 | 2/2009 | Abe et al. |
| 7,608,649 | B2 | 10/2009 | Sun et al. |
| 7,662,953 | B2 | 2/2010 | Valta et al. |
| 7,682,821 | B2 | 3/2010 | Woods et al. |
| 7,927,532 | B2 | 4/2011 | Scheer et al. |
| 7,932,378 | B2 | 4/2011 | Mikkonen et al. |
| 8,119,583 | B2 | 2/2012 | Day et al. |
| 8,222,232 | B2 | 7/2012 | Anderson et al. |
| 8,278,261 | B2 | 10/2012 | Day et al. |
| 8,450,083 | B2 | 5/2013 | Day et al. |
| 8,524,811 | B2 | 9/2013 | Shi et al. |
| 9,375,703 | B2 | 6/2016 | Harlin et al. |
| 2010/0272940 | A1* | 10/2010 | Shi ............... B29C 45/0001 428/36.92 |
| 2011/0303375 | A1 | 12/2011 | Shannon et al. |
| 2012/0130099 | A1 | 5/2012 | Wittenberg et al. |
| 2013/0153828 | A1 | 6/2013 | Kaneiwa et al. |
| 2013/0236937 | A1* | 9/2013 | Harlin et al. ............. 435/134 |
| 2013/0295268 | A1 | 11/2013 | Day et al. |
| 2013/0296591 | A1 | 11/2013 | Day et al. |

FOREIGN PATENT DOCUMENTS

| WO | WO 2008/151149 | 12/2008 |
| WO | WO 2009/126843 | 10/2009 |
| WO | WO 2010/063032 | 6/2010 |
| WO | WO 2010/120939 | 10/2010 |
| WO | WO 2010/125490 | 11/2010 |
| WO | WO 2010/138620 | 12/2010 |
| WO | WO 2011/150411 | 12/2011 |
| WO | WO 2013/096891 | 6/2013 |

OTHER PUBLICATIONS

Caliendo, Heather (Aug. 27, 2013) "Is algae plastic the next big thing in packaging?"Plastics Today.com, [retrieved from the Internet at http://www.plasticstoday.com/article/Is-algae-plastic-the-next-big-thing-in-packaging0827 . . . On Dec. 1, 2015], 2pp.
Chiellini et al. (2008) "Biodegradable Thermoplastic Composites Based on Polyvinyl Alcohol and Algae," *Biomacromolecules* 9:1007-1013.
Fowler et al. (2006) "Biocomposites: technology, environmental credentials and market forces," *Journal of the Science of Food and Agriculture* 86(12):1781-1789.
Lee et al. (2008) "Red algae fibre/poly(butylene succinate) biocomposites: The effect of fibre content on their mechanical and thermal properties," *Composites Science and Technology* 68:1266-1272.
Libra et al. (2011) "Hydrothermal carbonization of biomass residuals: a comparative review of the chemistry, processes and applications of wet and dry pyrolysis," *Biofuels* 2(1):89-124.
Otsuki et al. (2004) "Synthesis and Tensile Properties of a Novel Composite of *Chlorella* and Polyethylene," *Journal of Applied Polymer Science* 92:812-816.

(Continued)

*Primary Examiner* — Kelechi Egwim
(74) *Attorney, Agent, or Firm* — Weaver Austin Villeneuve & Sampson LLP

(57) ABSTRACT

Described herein are a wood plastic composite including an oleaginous microbial biomass, a thermoplastic composite including a heterotrophically cultivated microalgal biomass, and related articles and methods.

26 Claims, 2 Drawing Sheets

(56) References Cited

OTHER PUBLICATIONS

Plastic News (Aug. 9, 2012) "Georgia company commercializing algae-based 'green'plastics" [Retrieved from the Internet: URL: http://www.plasticsnews.com/article/20120809/NEWS/308099983], 5 Pages.

Zhang et al. (2000) "An exploratory research of PVC-Chlorella composite material (PCCM) as effective utilization of Chlorella biologically fixing $CO_2$," *Journal of Materials Science* 35:2603-2609.

Zhang et al. (2000) "Synthesis and characterization of a novel blend of polypropylene with *Chlorella*," *Journal of Material Chemistry* 10:2666-2672.

* cited by examiner

Sample 4-1

Sample 4-5

Sample 4-2

Sample 4-6

Sample 4-3

Sample 4-7

Sample 4-4

Sample 4-8

WOOD PLASTIC AND THERMOPLASTIC COMPOSITES

CROSS-REFERENCE TO RELATED APPLICATIONS

This application claims the benefit under 35 U.S.C. 119(e) of U.S. Provisional Patent Application Nos. 61/792,272, filed Mar. 15, 2013, 61/839,813, filed Jun. 26, 2013, and 61/879,525, filed Sep. 18, 2013. Each of these applications is incorporated herein by reference in its entirety for all purposes.

BACKGROUND

To form wood plastic composites that can mimic the appearance and mechanical properties of traditional wood products, wood fibers and flours are typically blended with synthetic polymers. However the hydrophobic nature of the synthetic polymers and the hydrophilic nature of the wood fibers and present challenges to the formation of blends having the desired look and physical characteristics of natural wood. Lubricants and coupling agents are often used to address the compatibility of the two main blend components, but their use increases the cost of the final product and can present additional problems. For example zinc stearate, a commonly used lubricant, is known to be unsuitable for use with popular coupling agents and can also result in a wood plastic product with decreased resistance to water absorption.

SUMMARY

In one embodiment, provided is a wood plastic composite comprising a blend of:
 a) a thermoplastic or thermoset resin;
 b) a cellulosic filler;
 c) a lubricant, and
 d) optionally a coupling agent,
wherein the lubricant comprises an oleaginous microbial biomass.

In some embodiments, the resin is a thermoplastic resin. In some embodiments, the resin is selected from the group consisting of a polyolefin, polyvinyl chloride, polylactic acid, and polymethyl methacrylate resin. In some embodiments, the polyolefin is polyethylene or polypropylene. In some embodiments, the polyethylene is high density polyethylene (HDPE) or recycled HDPE. In some embodiments, the resin comprises up to 30, 35, 40, 45, 50, 55, 60, 65, 70, 75, 80, or 85% by weight of the composite.

In some embodiments, the cellulosic filler is selected from the group consisting of a wood fiber, a wood flour, paper, coconut flour, coffee flour, rice hull, bamboo, and soy hull. In some embodiments, the cellulosic filler is an oak, pine, or maple wood fiber or flour. In some embodiments, the cellulosic filler comprises up to 10, 15, 20, 25, 30, 35, 40, 45, 50, 55, 60 or 65% of the composite.

In some embodiments, the coupling agent is a silane or a maleic anhydride grafted polyolefin. In some embodiments, the coupling agent is maleic anhydride grafted high density polyethylene (MAPE) or maleic anhydride grafted polypropylene (MAPP). In some embodiments, the coupling agent comprises up to 0.25, 0.5, 1, 2, 3, 4, or 5% by weight of the composite.

In some embodiments, the biomass is a whole cell. In other embodiments, biomass is a lysed cell.

In some embodiments, biomass is chemically modified. In other embodiments, the biomass is acylated. In still other embodiments, the biomass is acetylated.

In some embodiments, the biomass has an average particle size of from 0.1 to 500 microns. In other embodiments, the biomass has an average particle size about 350 microns.

In some embodiments, the biomass is an oleaginous bacteria, yeast, or microalgae. In some embodiments, the biomass is obtained from a heterotrophic oleaginous microalgae. In some embodiments, the microalgal biomass is obtained from microalgae cultivated with sugar from corn, sorghum, sugar cane, sugar beet, or molasses as a carbon source. In some embodiments, the microalgal biomass is obtained from microalgae cultivated on sucrose.

In some embodiments, the microalgal biomass is obtained from *Parachlorella, Prototheca*, or *Chlorella*. In some embodiments, the biomass obtained from *Prototheca moriformis*.

In some embodiments, the oleaginous microalgae has a fatty acid profile of at least 60% C18:1; or at least 50% combined total amount of C10, C12, and C14; or at least 70% combined total amount of C16:0 and C18:1.

In some embodiments, the oleaginous microalgae has a fatty acid profile of at least 80-85% C18:1. In some embodiments, a fatty acid profile also has less than 1% or 0.1% polyunsaturated fatty acids.

In some embodiments, the oleaginous microalgae comprises up to 1, 2, 3, 4, 5, 6, 7, 8, 9, 10, 11, 12, 13, 14, or 15% by weight of the composite.

In some embodiments the oleaginous microbial biomass reduces or eliminates the need for a wood product composite lubricant. In some embodiments, the lubricant is an oleaginous microbial biomass.

In some embodiments, the composite provided herein can have one or more improved bulk properties when an oleaginous biomass is used to as a lubricant replacement in a wood plastic composite. These properties include one or more of density, impact resistance, flexural strength, flexural modulus, and water absorptivity. In some embodiments, one or more of these properties are unaffected by replacement with an oleaginous biomass. In some embodiments, the composite provided herein can have one or more of the following properties; a density of less than 1.2 $g/cm^3$; an impact resistance of at least 0.6 ft-lb/inch; a flexural strength of at least 5000 psi; a flexural modulus of at least 550,000 psi; and a water absorption of less than 5, 4, 3, 2, or 1% by weight at 72 hours.

In some embodiments, composite provided herein further comprise one or more of a UV stabilizer, a colorant, and an anti-microbial agent.

In some embodiments, composite provided herein is free from metal stearates not derived from an oleaginous microbe. In some embodiments, composite provided herein is free from zinc stearate not derived from an oleaginous microbe.

In some embodiments, composite provided herein is a pellet.

In another embodiment, provided is an article of manufacture comprising a composite provided herein. Such articles include flooring material, outdoor decking, wood paneling, window framing material, interior trim material, railing, fencing, and an automotive part including interior automotive parts.

In another embodiment, provided is a method for preparing a wood plastic composite, the method comprising a) admixing an oleaginous microbial biomass with a thermoplastic resin, a cellulosic filler, and optionally a coupling agent to form a mixture;

b) extruding, injection molding, or calendaring said mixture to form the wood plastic composite.

In some embodiments, provided is a thermoplastic composite comprising a thermoplastic resin and a heterotrophically cultivated microalgal biomass, the biomass comprising greater than 65% by weight of the thermoplastic composite. In some embodiments the biomass comprises greater than 70%, 75%, 80%, 85%, or 90% by weight of the thermoplastic composite.

In certain embodiments, the biomass in the composites provided herein comprise less than 20% protein. In certain embodiments the biomass comprises less than 15% protein. In certain embodiments the biomass comprises less than 10% protein.

In some embodiments, the composites provided herein further comprise sucrose. In certain embodiments the composites comprise at least 0.1%, 0.5%, or 1% sucrose. In certain embodiments the composites comprise from 0.5% to 1% sucrose. In certain embodiments the composites comprise sucrose and fructose. In certain embodiments the composites comprise from 0.5 to 2% sucrose and fructose.

In some embodiments, the composites provided herein further comprise sucrose. In certain embodiments the composites comprise at least 0.1%, 0.5%, 1%, 1.5%, or 2% glucose. In certain embodiments the composites comprise from 0.5% to 2% glucose. In certain embodiments the composites comprise from 0.5% to 1% glucose.

In some embodiments, the composites provided herein further comprise a capstock. The capstock forms an outer layer on at least a portion of the composite. Particularly in an outdoor setting, the capstock acts to protect the inner core from exposure to the environment such as to moisture, mold, and mildew.

In some embodiments the capstock comprises a thickness of about 0.012 inches to about 0.040 inches. In other embodiments the capstock comprises a thickness of about 0.015 inches to about 0.020 inches.

The capstock can be formed as disclosed in US 2010/0159213 such as by co-extrusion. In some embodiments the capstock comprises an ionomer. Suitable ionomers are selected from ethylene/methacrylic acid copolymers and zinc ionomers thereof.

The capstock can also be formed as disclosed in US 2012/0315471, wherein the capstock comprises at least one of an elastomer and a plastomer. In some embodiments the elastomer comprises at least one of a propylene based elastomer, an ethylene propylene diene monomer, a three block thermoplastic elastomer, and a two block thermoplastic elastomer. In some embodiments the plastomer comprises at least one of a metallocene, very low density polyethylene, polyethylene, and ethylene methacrylate.

In some embodiments the capstock further comprises one or more of a colorant, a variegated colorant, a UV stabilizer, an antioxidant, an antistatic agent, a biocide, and a fire retardant.

DESCRIPTION

Figure 1:
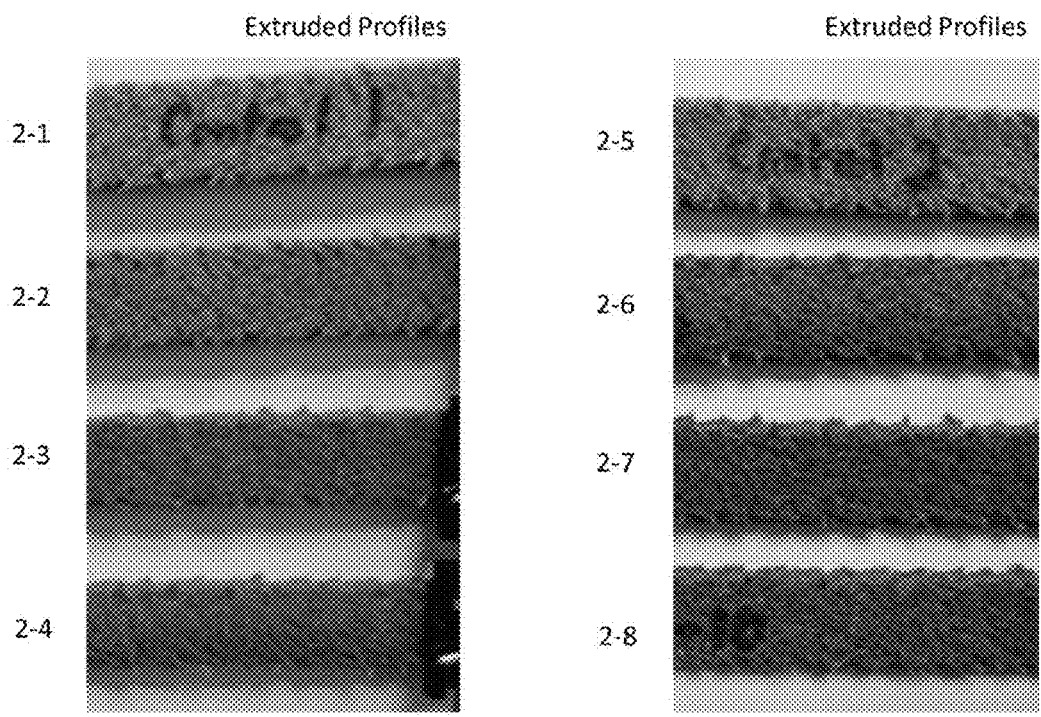
FIG. 1 shows extruded profiles of wood plastic composite compositions in connection with biomass in an embodiment of the compositions as illustrated in Example 3.

"About" refers to the stated value ±10%.

"Acylation" refers to a reaction between a reactant having a hydroxy group and a reactant having activated carbonyl group to produce an ester linkage. Activated carbonyl groups include anhydrides, esters, acids, and acyl groups having a leaving group such as a halide attached to the carbonyl carbon. "Acetylation" refers to an ester producing reaction where one of the reactants has an acetyl ($CH_3C\!\!=\!\!O\!-$) group.

"Biomass" is material produced by growth and/or propagation of cells including whole cells, whole cell debris, cell wall material, polysaccharides, triglycerides, proteins, and other intracellular or extracellular components. "Residual biomass" refers to biomass that remains after cells are processed, such as when oil is extracted. In certain embodiments, the biomass comprises 65-50%, 50-30%, 40-20%, 30-10%, 20-10%, and 10-5% of the compositions provided herein.

"Oleaginous microbial biomass" shall mean biomass derived from oleaginous microbes.

An "oleaginous" cell is a cell capable of producing at least 20% lipid by dry cell weight, either in its wild-type form or upon recombinant or classical strain improvement. An "oleaginous microbe" or "oleaginous microorganism" is a microbe, including a microalga, that is oleaginous. In some embodiments, the cell produces at least 50%, at least 60%, at least 70%, at least 80%, or at least and 90% triglyceride by dry cell weight.

The term "bulk properties" in connection with the compositions provided herein refers to any measurable property of the composition, including those properties that are dependent on the size of the composition. Bulk properties include physical, mechanical, thermal, optical, barrier, and related performance properties of the composition. Specific properties include but are not limited to density, impact resistance, tensile strength, flexural strength, seal strength, glass transition temperature, melting point, melt flow index, porosity, thickness, color, brightness, opacity, light scattering, light absorption, roughness, water vapor transition rate, and water absorption. Bulk properties can be tested using conventional methods, such as those published by ASTM (American Society for Testing and Materials) International, TAPPI Standards, Scandinavian Pulp, Paper and Board Testing Committee (SCAN-C) and International Organization for Standardization (ISO). In some embodiments, the bulk properties of the composition differ in comparison to the bulk properties of the moldable polymer alone by 25% or less. In some embodiments, one of the bulk properties is increased by 10% or less. In other embodiments, one of the bulk properties is decreased by 10% or less.

The term "moldable polymer" refers to moldable synthetic or semi-synthetic polymers for use in plastics. The moldable polymers may be amorphous or semicrystalline, and include thermoplastic and thermosetting polymers. In some embodiments, the moldable polymer is also a biodegradable polymer.

In connection with a biomass derived material, "thermoplastic" shall mean a material or composition that is thermoplastic or is thermoplastic-like in that, in the presence of a plasticizer, elevated temperatures, and/or shearing, it melts and fluidizes, enabling its use in preparing articles traditionally made with thermoplastics. In one embodiment, microbial biomass is subjected to elevated temperatures and shearing in the presence of a plasticizer (e.g. a known thermoplastic) to form thermoplastics or blends thereof. In the softened state, the thermoplastic material can be formed into a finished product. Often, the thermoplastic material is first made into pellets, blocks or other convenient size; the pellets or blocks are re-softened, typically by heating, and shaped into a finished product.

"Thermoset" shall mean a material or composition that cures or hardens into a desired shape by the application of heat, radiation (e.g., ultraviolet light, laser radiation, etc.) or other energy sources to the material, or by a chemical reaction. Prior to curing, thermoset materials are malleable and can be molded into a desired form. Once cured, the thermoset material cannot be softened and remolded to a different form. The curing process transforms the material by a cross-linking process.

"Colored molecules" or "color generating impurities" as used herein refer to any compound that imparts a color to the extracted oil. "Colored molecules" or "color generating impurities" include for example, chlorophyll a, chlorophyll b, lycopenes, tocopherols, campesterols, tocotrienols, and carotenoids, such as beta carotene, luteins, zeaxanthin, astaxanthin. These molecules are preferably present in the microbial biomass or the extracted oil at a concentration of no more than 500 ppm, no more than 250 ppm, no more than 100 ppm, no more than 75 ppm, or no more than 25 ppm. In other embodiments, the amount of chlorophyll that is present in the microbial biomass or the extracted oil is less than 500 mg/kg, less than 100 mg/kg, less than 10 mg/kg, less than 1 mg/kg, less than 0.5 mg/kg, less than 0.1 mg/kg, less than 0.05 mg/kg, or less than 0.01 mg/kg.

"Cultivated", and variants thereof such as "cultured" and "fermented", refer to the intentional fostering of growth (increases in cell size, cellular contents, and/or cellular activity) and/or propagation (increases in cell numbers) of one or more cells by use of selected and/or controlled conditions. The combination of both growth and propagation is termed "proliferation." Examples of selected and/or controlled conditions include the use of a defined medium (with known characteristics such as pH, ionic strength, and carbon source), specified temperature, oxygen tension, carbon dioxide levels, and growth in a bioreactor. "Cultivated" does not refer to the growth or propagation of microorganisms in nature or otherwise without human intervention; for example, natural growth of an organism that ultimately becomes fossilized to produce geological crude oil is not cultivation. In some embodiments, microbes such as microalgae are cultivated on sugar from corn, sorghum, sugar cane, sugar beet, or molasses. In other embodiments the microbes are cultivated on sucrose.

"Covalently modified" shall mean microbial biomass wherein the polysaccharides, the proteins, or the triacylglycerols within the microbial biomass have been covalently modified with a hydrophobic group, a hydrophilic group, an anionic group or a cationic group prior to the formation of the thermoplastic material. During the thermoplastic forming process, components of the microbial biomass, for example, polysaccharides, proteins, and/or triacylglycerols, may be further covalently modified by exposure of the microbial biomass to heat, shearing and plasticizer.

"Lipid" refers to fatty acids and their derivatives, including free fatty acids and their salts, as well as fatty acid esters. Fatty acid esters include fatty acid alkyl esters and triacylglycerides. Fatty acid salts include sodium, potassium, magnesium, and calcium salts. Fatty acids can be referred to by shorthand notation "carbon number:number of double bonds". Thus C18:1 refers to an 18 carbon fatty acid chain having one double bond. In certain embodiments, the lipids provided herein comprise 15%, 10%, 5%, or 2% or less of the plastic and film compositions provided herein. In other embodiments the lipid is a calcium salt. In still other embodiments the lipid has at least 60% C18:1; or at least 50% combined total amount of C10, C12, and C14; or at least 70% combined total amount of C16:0 and C18:1.

A "fatty acid profile" is the distribution of fatty acyl groups in the triglycerides of the oil without reference to attachment to a glycerol backbone. Fatty acid profiles are typically determined by conversion to a fatty acid methyl ester (FAME), followed by gas chromatography (GC) analysis with flame ionization detection (FID). The fatty acid profile can be expressed as one or more percent of a fatty acid in the total fatty acid signal determined from the area under the curve for that fatty acid. FAME-GC-FID measurement approximate weight percentages of the fatty acids. A "sn-2 profile" is the distribution of fatty acids found at the sn-2 position of the triacylglycerides in the oil. A "regiospecific profile" is the distribution of triglycerides with reference to the positioning of acyl group attachment to the glycerol backbone without reference to stereospecificity. In other words, a regiospecific profile describes acyl group attachment at sn-1/3 vs. sn-2. Thus, in a regiospecific profile, POS (palmitate-oleate-stearate) and SOP (stearate-oleate-palmitate) are treated identically. A "stereospecific profile" describes the attachment of acyl groups at sn-1, sn-2 and sn-3. Unless otherwise indicated, triglycerides such as SOP and POS are to be considered equivalent. A "TAG profile" is the distribution of fatty acids found in the triglycerides with reference to connection to the glycerol backbone, but without reference to the regiospecific nature of the connections. Thus, in a TAG profile, the percent of SSO in the oil is the sum of SSO and SOS, while in a regiospecific profile, the percent of SSO is calculated without inclusion of SOS species in the oil. In contrast to the weight percentages of the FAME-GC-FID analysis, triglyceride percentages are typically given as mole percentages; that is the percent of a given TAG molecule in a TAG mixture. Unless specified otherwise, the fatty acid profile is expressed as a weight percent of the total fatty acid content.

"Lysis" is the breakage of the plasma membrane and optionally the cell wall of a biological organism sufficient to release at least some intracellular content, often by mechanical, chemical, viral or osmotic mechanisms that compromise its integrity. "Lysing" is the process of lysis.

"Microalgae" is a microbial organism that contains a chloroplast or plastid, and optionally that is capable of performing photosynthesis, or a prokaryotic microbial organism capable of performing photosynthesis. Microalgae include obligate photoautotrophs, which cannot metabolize a fixed carbon source as energy, as well as heterotrophs, which can live solely off of a fixed carbon source. Microalgae include unicellular organisms that separate from sister cells shortly after cell division, such as *Chlamydomonas*, as well as microbes such as, for example, *Volvox*, which is a simple multicellular photosynthetic microbe of two distinct cell types. Microalgae include cells such as *Chlorella*, *Dunaliella*, and *Prototheca*. Microalgae also include other microbial photosynthetic organisms that exhibit cell-cell adhesion, such as *Agmenellum, Anabaena*, and *Pyrobotrys*. Microalgae also include obligate heterotrophic microorganisms that have lost the ability to perform photosynthesis, such as certain dinoflagellate algae species and species of the genus *Prototheca*. In some embodiments the microalgae is a *Parachlorella, Prototheca, Chlorella* or strains having at least 85% nucleotide sequence identity in 23S rRNA sequences to a *Parachlorella, Prototheca,* or *Chlorella* strain. Certain nucleic acid sequences are disclosed in WO2009/126843 which is incorporated herein by reference in its entirety. Such sequences in WO2009/126843 include SEQ ID NOs:3-29.

The term "sugar" in connection with algal feedstock refers to carbohydrates that are derived from natural sources or that are synthetically or semi-synthetically prepared. Sugar can be derived from natural sources such as through extraction (e.g. sugarcane or sugar beet) or by further chemical, enzymatic processing (e.g. sugar from corn), and/or by depolymerizaton of cellulosic materials.

Production of Biomass.

In various embodiments, the biomass is prepared by fermentation of a microbe selected from the group consisting of microalgae, oleaginous bacteria, oleaginous yeast, and fungi. In various embodiments, the microalgae is a species of a genus selected from *Chlorella, Parachlorella,* or *Prototheca,* or is one of the other species in Table 1. In various embodiments, the oleaginous bacteria is a species of the genus *Rhodococcus.* In various embodiments, the oleaginous yeast is *Rhodosporidium toruloides* or another species listed in Table 2. In various embodiments, the fungus is a species listed in Table 3.

In various embodiments, the microalgae are of the genera *Chlorella* and *Prototheca,* including *Chlorella protothecoides* and *Prototheca moriformis,* which are capable of accumulating substantial amounts of triglyceride (e.g., 50 to 85% by dry cell weight). In an embodiment of the present invention, the microorganism is of the genus *Chlorella,* preferably, *Chlorella protothecoides, Chlorella ellipsoidea, Chlorella minutissima,* or *Chlorella emersonii. Chlorella* is a genus of single-celled green algae, belonging to the phylum *Chlorophyta.* It is spherical in shape, about 2 to 10 μm in diameter, and is without flagella. Some species of Chlorella are naturally heterotrophic. In an embodiment of the present invention, the microorganism is of the genus *Prototheca,* which are obligate heterotrophs.

TABLE 1

Microalgae.

*Achnanthes orientalis, Agmenellum, Amphiprora hyaline, Amphora coffeiformis, Amphora coffeiformis linea, Amphora coffeiformis punctata, Amphora coffeiformis taylori, Amphora coffeiformis tenuis, Amphora delicatissima, Amphora delicatissima capitata, Amphora* sp., *Anabaena, Ankistrodesmus, Ankistrodesmus falcatus, Boekelovia hooglandii, Borodinella* sp., *Botryococcus braunii, Botryococcus sudeticus, Bracteoccocus aerius, Bracteococcus* sp., *Bracteacoccus grandis, Bracteacoccus cinnabarinas, Bracteococcus minor, Bracteococcus medionucleatus, Carteria, Chaetoceros gracilis, Chaetoceros muelleri, Chaetoceros muelleri subsalsum, Chaetoceros* sp., *Chlorella anitrata, Chlorella Antarctica, Chlorella aureoviridis, Chlorella candida, Chlorella capsulate, Chlorella desiccate, Chlorella ellipsoidea, Chlorella emersonii, Chlorella fusca, Chlorella fusca var. vacuolate, Chlorella glucotropha, Chlorella infusionum, Chlorella infusionum var. actophila, Chlorella infusionum var. auxenophila, Chlorella kessleri, Chlorella lobophora* (strain SAG 37.88), *Chlorella luteoviridis, Chlorella luteoviridis var. aureoviridis, Chlorella luteoviridis var. lutescens, Chlorella miniata, Chlorella cf. minutissima, Chlorella minutissima, Chlorella mutabilis, Chlorella nocturna, Chlorella ovalis, Chlorella parva, Chlorella photophila, Chlorella pringsheimii, Chlorella protothecoides* (including any of UTEX strains 1806, 411, 264, 256, 255, 250, 249, 31, 29, 25), *Chlorella protothecoides var. acidicola, Chlorella regularis, Chlorella regularis var. minima, Chlorella regularis var. umbricata, Chlorella reisiglii, Chlorella saccharophila, Chlorella saccharophila var. ellipsoidea, Chlorella salina, Chlorella simplex, Chlorella sorokiniana, Chlorella* sp., *Chlorella sphaerica, Chlorella stigmatophora, Chlorella vanniellii, Chlorella vulgaris, Chlorella vulgaris f. tertia, Chlorella vulgaris var. autotrophica, Chlorella vulgaris var. viridis, Chlorella vulgaris var. vulgaris, Chlorella vulgaris var. vulgaris f. tertia, Chlorella vulgaris var. vulgaris f. viridis, Chlorella xanthella, Chlorella zofingiensis, Chlorella trebouxioides, Chlorella vulgaris, Chlorococcum infusionum, Chlorococcum* sp., *Chlorogonium, Chroomonas* sp., *Chrysosphaera* sp., *Cricosphaera* sp., *Crypthecodinium cohnii, Cryptomonas sp., Cyclotella cryptica, Cyclotella meneghiniana, Cyclotella* sp., *Dunaliella* sp., *Dunaliella bardawil, Dunaliella bioculata, Dunaliella granulate, Dunaliella maritime, Dunaliella minuta, Dunaliella parva, Dunaliella peircei, Dunaliella primolecta, Dunaliella salina, Dunaliella terricola, Dunaliella tertiolecta, Dunaliella viridis, Dunaliella tertiolecta, Eremosphaera viridis, Eremosphaera* sp., *Ellipsoidon* sp., *Euglena, Franceia* sp., *Fragilaria crotonensis, Fragilaria* sp., *Gleocapsa* sp., *Gloeothamnion* sp., *Hymenomonas* sp., *Isochrysis* aff. *galbana, Isochrysis galbana, Lepocinclis, Micractinium, Micractinium* (UTEX LB 2614), *Monoraphidium minutum, Monoraphidium* sp., *Nannochloris* sp., *Nannochloropsis salina, Nannochloropsis* sp., *Navicula acceptata, Navicula biskanterae, Navicula pseudotenelloides, Navicula pelliculosa, Navicula saprophila, Navicula* sp., *Neochloris oleabundans, Nephrochloris* sp., *Nephroselmis* sp., *Nitschia communis, Nitzschia alexandrine, Nitzschia communis, Nitzschia dissipata, Nitzschia frustulum, Nitzschia hantzschiana, Nitzschia inconspicua, Nitzschia intermedia, Nitzschia microcephala, Nitzschia pusilla, Nitzschia pusilla elliptica, Nitzschia pusilla monoensis, Nitzschia quadrangular, Nitzschia* sp., *Ochromonas* sp., *Oocystis parva, Oocystis pusilla, Oocystis* sp., *Oscillatoria limnetica, Oscillatoria* sp., *Oscillatoria subbrevis, Parachlorella beijerinckii, Parachlorella kessleri, Pascheria acidophila, Pavlova* sp., *Phagus, Phormidium, Platymonas* sp., *Pleurochrysis carterae, Pleurochrysis dentate, Pleurochrysis* sp., *Prototheca stagnora, Prototheca portoricensis, Prototheca moriformis, Prototheca wickerhamii, Prototheca zopfii, Pseudochlorella aquatica, Pyramimonas* sp., *Pyrobotrys, Sarcinoid chrysophyte, Scenedesmus armatus, Scenedesmus rubescens, Schizochytrium, Spirogyra, Spirulina platensis, Stichococcus* sp., *Synechococcus* sp., *Tetraedron, Tetraselmis* sp., *Tetraselmis suecica, Thalassiosira weissflogii,* and *Viridiella fridericiana.*

TABLE 2

Oleaginous Yeast.

*Candida apicola, Candida* sp., *Cryptococcus curvatus, Cryptococcus terricolus, Debaromyces hansenii, Endomycopsis vernalis, Geotrichum carabidarum, Geotrichum cucujoidarum, Geotrichum histeridarum, Geotrichum silvicola, Geotrichum vulgare, Hyphopichia burtonii, Lipomyces lipofer, Lypomyces orentalis, Lipomyces starkeyi, Lipomyces tetrasporous, Pichia mexicana, Rodosporidium sphaerocarpum, Rhodosporidium toruloides Rhodotorula aurantiaca, Rhodotorula dairenensis, Rhodotorula diffluens, Rhodotorula glutinus, Rhodotorula glutinis* var. *glutinis, Rhodotorula gracilis, Rhodotorula graminis Rhodotorula minuta, Rhodotorula mucilaginosa, Rhodotorula mucilaginosa* var. *mucilaginosa, Rhodotorula terpenoidalis, Rhodotorula toruloides, Sporobolomyces alborubescens, Starmerella bombicola, Torulaspora delbruekii, Torulaspora pretoriensis, Trichosporon behrend, Trichosporon brassicae, Trichosporon domesticum, Trichosporon laibachii, Trichosporon loubieri, Trichosporon loubieri* var. *loubieri, Trichosporon montevideense, Trichosporon pullulans, Trichosporon* sp., *Wickerhamomyces Canadensis, Yarrowia lipolytica,* and *Zygoascus meyerae.*

TABLE 3

Oleaginous Fungi.

*Mortierella, Mortierrla vinacea, Mortierella alpine, Pythium debaryanum, Mucor circinelloides, Aspergillus ochraceus, Aspergillus terreus, Pennicillium iilacinum, Hensenulo, Chaetomium, Cladosporium, Malbranchea, Rhizopus,* and *Pythium.*

The microalgae may be genetically engineered by introducing an exogenous gene so as to allow the cells utilize an alternate sugar and/or to alter the chain length and saturation profiles of the fatty acids produced by the microalgal cells. For example the cells may use sucrose (e.g., from sugar cane, beets or palm) by recombinant introduction of an exogenous secreted sucrose invertase gene, chain length distribution may be altered through the introduction of an exogenous acyl-ACP thioesterase and/or reduction of endogenous acyl-ACP thioesterase activity (e.g., knockout or knockdown), and saturation profile may be altered through the introduction of an exogenous fatty acid desaturase and/or reduction of endogenous desaturase activity (e.g., knockout or knockdown).

In some embodiments, engineered microalgal cell has very low levels of polyunsaturated fatty acids. The natural oil isolated from the cell can be a liquid or solid at room temperature, or a blend of liquid and solid oils, including the regiospecific or stererospecific oils, high stearate oils, or high mid-chain oils. Oxidative stability can be measured by the Rancimat method using the AOCS Cd 12b-92 standard test at a defined temperature. For example, the OSI (oxidative stability index) test may be run at temperatures between 110° C. and 140° C. The oil is produced by cultivating cells (e.g., any of the plastidic microbial cells mentioned above or elsewhere herein) that are genetically engineered to reduce the activity of one or more fatty acid desaturase. For example, the cells may be genetically engineered to reduce the activity of one or more fatty acyl Δ12 desaturase(s) responsible for converting oleic acid (18:1) into linoleic acid (18:2) and/or one or more fatty acyl Δ15 desaturase(s) responsible for converting linoleic acid (18:2) into linolenic acid (18:3). Various methods may be used to inhibit the desaturase including knockout or mutation of one or more alleles of the gene encoding the desaturase in the coding or regulatory regions, inhibition of RNA transcription, or translation of the enzyme, including RNAi, siRNA, miRNA, dsRNA, antisense, and hairpin RNA techniques. Other techniques known in the art can also be used including introducing an exogenous gene that produces an inhibitory protein or other substance that is specific for the desaturase.

In a specific embodiment, fatty acid desaturase (e.g., Δ12 fatty acid desaturase) activity in the cell is reduced to such a degree that the cell is unable to be cultivated or is difficult to cultivate (e.g., the cell division rate is decreased more than 10, 20, 30, 40, 50, 60, 70, 80, 90, 95, 97 or 99%). Achieving such conditions may involve knockout, or effective suppression of the activity of multiple gene copies (e.g. 2, 3, 4 or more) of the desaturase or their gene products. A specific embodiment includes the cultivation in cell culture of a full or partial fatty acid auxotroph with supplementation of the fatty acid or a mixture of fatty acids so as to increase the cell number, then allowing the cells to accumulate oil (e.g. to at least 40% by cell weight). Alternatively, the cells comprise a regulatable fatty acid synthesis gene that can be switched in activity. For example, the regulation can be based on environmental conditions and the environmental conditions during a first, cell division, phase favor production of the fatty acid and the environmental conditions during a second, oil accumulation, phase disfavor production of the oil.

In a specific embodiment, a cell is cultivated using a modulation of linoleic acid levels within the cell. In particular, the natural oil is produced by cultivating the cells under a first condition that is permissive to an increase in cell number due to the presence of linoleic acid and then cultivating the cells under a second condition that is characterized by linoleic acid starvation and thus is inhibitory to cell division, yet permissive of oil accumulation. For example, a seed culture of the cells may be produced in the presence of linoleic acid added to the culture medium. For example, the addition of linoleic acid to 0.25 g/L in the seed culture of a *Prototheca* strain deficient in linoleic acid production due to ablation of two alleles of a fatty acyl Δ12 desaturase (i.e., a linoleic auxotroph) was sufficient to support cell division to a level comparable to that of wild type cells. Optionally, the linoleic acid can then be consumed by the cells, or otherwise removed or diluted. The cells are then switched into an oil producing phase (e.g., supplying sugar under nitrogen limiting conditions as described in WO2010/063032). Surprisingly, oil production has been found to occur even in the absence of linoleic acid, as demonstrated in the obligate heterotroph oleaginous microalgae *Prototheca* but generally applicable to other oleaginous microalgae, microorganism, or even multicellular organisms (e.g., cultured plant cells). Under these conditions, the oil content of the cell can increase to about 10, 20, 30, 40, 50, 60, 70, 80, 90%, or more by dry cell weight, while the oil produced can have polyunsaturated fatty acid (e.g.; linoleic+linolenic) profile with 5%, 4%, 3%, 2%, 1%, 0.5%, 0.3%, 0.2%, 0.1%, 0.05% or less, as a percent of total triacylglycerol fatty acids in the oil. For example, the oil content of the cell can be 50% or more by dry cell weight and the triglyceride of the oil produced less than 3% polyunsaturated fatty acids.

These oils can also be produced without the need (or reduced need) to supplement the culture with linoleic acid by using cell machinery to produce the linoleic acid, but predominantly or only during the cell division phase. The linoleic-producing cell machinery may be regulatable so as to produce substantially less linoleic acid during the oil producing phase. The regulation may be via modulation of transcription of the desaturase gene(s). For example, the majority, and preferably all, of the fatty acid Δ12 desaturase activity can be placed under a regulatable promoter regulated to express the desaturase in the cell division phase, but to be reduced or turned off during the oil accumulation phase. The regulation can be linked to a cell culture condition such as pH, and/or nitrogen level, as described in the examples herein, or other environmental condition. In practice, the condition may be manipulated by adding or removing a substance (e.g., protons via addition of acid or base) or by allowing the cells to consume a substance (e.g, nitrogen-supplying nutrients) to effect the desired switch in regulation of the destaurase activity.

Other genetic or non-genetic methods for regulating the desaturase activity can also be used. For example, an inhibitor of the desaturase can be added to the culture medium in a manner that is effective to inhibit polyunsaturated fatty acids from being produced during the oil production phase.

Using one or more of these desaturase regulation methods, it is possible to obtain a cell and/or a natural oil that it is believed has been previously unobtainable, especially in large scale cultivation in a bioreactor (e.g., more than 1000 L). The oil from the cell can have polyunsaturated fatty acid levels that are 5%, 4%, 3%, 2%, 1%, 0.5%, 0.3%, 0.2%, or less, as a percent of total triacylglycerol fatty acids in the oil.

Sterols contain from 27 to 29 carbon atoms (C27 to C29) and are found in all eukaryotes. Animals exclusively make C27 sterols as they lack the ability to further modify the C27 sterols to produce C28 and C29 sterols. Plants however are able to synthesize C28 and C29 sterols, and C28/C29 plant sterols are often referred to as phytosterols. The sterol profile of a given plant is high in C29 sterols, and the primary sterols in plants are typically the C29 sterols β-sitosterol and stigmasterol. In contrast, the sterol profile of non-plant organisms contain greater percentages of C27 and C28 sterols. For example the sterols in fungi and in many microalgae are principally C28 sterols. The sterol profile and particularly the striking predominance of C29 sterols over C28 sterols in plants has been exploited for determining the proportion of plant and marine matter in soil samples (Huang, Wen-Yen, Meinschein W. G., "Sterols as ecological indicators"; Geochimica et Cosmochimia Acta. Vol 43. pp 739-745).

In some embodiments the primary sterols in the microalgal biomass/oils provided herein are sterols other than β-sitosterol and stigmasterol. In some embodiments the, C29 sterols make up less than 50%, 40%, 30%, 20%, 10%, or 5% by weight of the total sterol content.

In some embodiments, the microalgal biomass/oil comprise C29 and C28 sterols, wherein the amount of C28 sterols is greater than C29 sterols. In some embodiments, the C28 sterols make up greater than 50%, 60%, 70%, 80%, 90%, or 95% by weight of the total sterol content. In some embodiments the C28 sterol is ergosterol. In some embodiments the C28 sterol is brassicasterol.

It has been found that microalgae of Trebouxiophyceae can be distinguished from vegetable oils based on their sterol profiles. Oil produced by *Chlorella protothecoides* was found to produce sterols that appeared to be brassicasterol, ergosterol, campesterol, stigmasterol, and β-sitosterol, when detected by GC-MS. However, it is believed that all sterols produced by *Chlorella* have C24β stereochemistry. Thus, it is believed that the molecules detected as campesterol, stigmasterol, and β-sitosterol, are actually 22,23-dihydrobrassicasterol, proferasterol and clionasterol, respectively. Thus, the biomass/oils produced by the microalgae described herein can be distinguished from plant oils by the presence of sterols with C24β stereochemistry and the absence of C24α stereochemistry in the sterols present. For example, the oils produced may contain 22,23-dihydrobrassicasterol while lacking campesterol; contain Clionasterol, while lacking in β-sitosterol, and/or contain poriferasterol while lacking stigmasterol. Alternately, or in addition, the oils may contain significant amounts of Δ$^7$-poriferasterol.

In some embodiments, the microalgal biomass/oil comprise one or more of: at least 10% ergosterol; ergosterol and β-sitosterol, wherein the ratio of ergosterol to β-sitosterol is greater than 25:1; ergosterol and brassicasterol; ergosterol, brassicasterol, and poriferasterol, and wherein the oil is optionally free from one or more of β-sitosterol, campesterol, and stigmasterol.

In some embodiments, the biomass/oil provided herein comprises, as a percentage of total sterols, less than 20%, 15%, 10%, 5%, 4%, 3%, 2%, or 1% 24-ethylcholest-5-en-3-ol. In some embodiments, the 24-ethylcholest-5-en-3-ol is clionasterol. In some embodiments, the biomass/oil provided herein comprises, as a percentage of total sterols, at least 1%, 2%, 3%, 4%, 5%, 6%, 7%, 8%, 9%, or 10% clionasterol.

In some embodiments, the biomass/oil provided herein contains, as a percentage of total sterols, less than 20%, 15%, 10%, 5%, 4%, 3%, 2%, or 1% 24-methylcholest-5-en-3-ol. In some embodiments, the 24-methylcholest-5-en-3-ol is 22,23-dihydrobrassicasterol. In some embodiments, the biomass/oil provided herein comprises, as a percentage of total sterols, at least 1%, 2%, 3%, 4%, 5%, 6%, 7%, 8%, 9%, or 10% 22,23-dihydrobrassicasterol.

In some embodiments, the biomass/oil provided herein contains, as a percentage of total sterols, less than 20%, 15%, 10%, 5%, 4%, 3%, 2%, or 1% 5,22-cholestadien-24-ethyl-3-ol. In some embodiments, the 5,22-cholestadien-24-ethyl-3-ol is poriferasterol. In some embodiments, the biomass/oil provided herein comprises, as a percentage of total sterols, at least 1%, 2%, 3%, 4%, 5%, 6%, 7%, 8%, 9%, or 10% poriferasterol.

In some embodiments, biomass/oil provided herein contains ergosterol or brassicasterol or a combination of the two. In some embodiments, the biomass/oil provided herein contains, as a percentage of total sterols, at least 5%, 10%, 20%, 25%, 35%, 40%, 45%, 50%, 55%, 60%, or 65% ergosterol. In some embodiments, the biomass/oil contains, as a percentage of total sterols, at least 25% ergosterol. In some embodiments, the biomass/oil contains, as a percentage of total sterols, at least 40% ergosterol. In some embodiments, the biomass/oil contains, as a percentage of total sterols, at least 5%, 10%, 20%, 25%, 35%, 40%, 45%, 50%, 55%, 60%, or 65% of a combination of ergosterol and brassicasterol.

In some embodiments, the biomass/oil contains, as a percentage of total sterols, at least 1%, 2%, 3%, 4% or 5% brassicasterol. In some embodiments, the biomass/oil contains, as a percentage of total sterols less than 10%, 9%, 8%, 7%, 6%, or 5% brassicasterol.

In some embodiments the ratio of ergosterol to brassicasterol is at least 5:1, 10:1, 15:1, or 20:1.

In some embodiments, the biomass/oil contains, as a percentage of total sterols, at least 5%, 10%, 20%, 25%, 35%, 40%, 45%, 50%, 55%, 60%, or 65% ergosterol and less than 20%, 15%, 10%, 5%, 4%, 3%, 2%, or 1% β-sitosterol. In some embodiments, the biomass/oil contains, as a percentage of total sterols, at least 25% ergosterol and less than 5% β-sitosterol. In some embodiments, the biomass/oil further comprises brassicasterol.

In some embodiments, color-generating compounds (e.g., carotenoids) are present in the microbial biomass at a concentration of no more than 6000 ppm, no more than 5000 ppm, no more than 4000 ppm, no more than 3000 ppm, no more than 2000 ppm, no more than 1000 ppm, 500 ppm, no more than 250 ppm, no more than 100 ppm, no more than 75 ppm, or no more than 25 ppm. Color-generating compounds include carotenoids such as lutein, beta carotene, zeaxanthin, astaxanthin and chlorophyll. In other embodiments, the amount of chlorophyll that is present in the microbial biomass is less than 3500 ppm, less than 3000 ppm, less than 2500 ppm, less than 2000 ppm, less than 1500 ppm, less than 1000 ppm, less than 500 ppm, less than 400 ppm, less than 300 ppm, less than 200 ppm, less than 100 ppm, less than 50 ppm, less than 25 ppm, less than 10 ppm, less than 5 ppm, less than 1 ppm. The amount of chlorophyll that is present in the microbial biomass can range from, e.g., 0.1 ppm to 3000 ppm; this range can be bounded by any of the values in the previous sentence.

Optionally, by using biomass produced from heterotrophically cultivated cells, the resulting compositions may have less color, especially green color, due to lack of chlorophyll. As a result, reduced bleaching or use of lesser amounts of colorants may be required to achieve an article with an acceptable color. Color characteristics may be analyzed by quantification of color according to methods utilizing a three-component theory of color vision. In colorimetry, these components are referred to as X-Y-Z coordinates. Alternatively or in addition, color characteristics may be quantified through the use of spectrophotometry or other methods known in the art.

When processed into compositions such as thermoplastics, thermosets, absorbents, adsorbents, or paper, algal biomass derived from microalgae or microalgae cultivated photosynthetically, such as in ponds, swamps, waste water treatment facilities, or photobioreactors impart a visually unappealing green color to the composition and/or have an unpleasant fishy or seaweed odor. In specific embodiments, the oleaginous microorganism can be cultivated heterotrophically, in the dark. The cells of the microorganism can have less than 2.5% DHA (docosahexaenoic acid); less than 3000 ppm chlorophyll; less than 5000 ppm of color generating compounds; and/or be lacking in an unpleasant odor.

Extraction of Triglycerides.

After growing the cells, triglycerides may be extracted to give de-fatted biomass. Methods for oil extraction, pressing, and cell lysis are given in WO2008/151149, WO2010/063032, WO2010/120939, and WO2010/138620. Oil may be extracted (step 120) by one or more of mechanical pressing, solvent (e.g., hexane) extraction, sonication, or other suitable method. Mechanical pressing methods may optionally include addition of press aid. For example, WO2010/120939 teaches a device and method for pressing of oil from microalgae using a press-aid (also referred to therein as a "bulking agent"). The addition of fibrous pressing aids such as soybean hulls helps extract lipid. Step 120 is optional, in that some of the methods disclosed herein are applicable to whole cells or cells that have low amounts of triglyceride. However, in a preferred embodiment, triglyceride is produced and recovered, followed by utilization of the residual biomass. Where the triglyceride is produced and recovered, typically more than 5% of the dry cell weight is recovered as triglyceride. In certain cases, more than 10%, 15%, 20%, 25%, 30%, 35%, 40%, 45%, 50%, 55%, 60%, 65%, 70%, 75%, 80%, 85%, 90%, 95%, 98% of the dry cell weight may be recovered as triglyceride.

The addition of a press aid or bulking agent may be advantageous in some embodiments of the invention. When there is high oil content and low fiber in the biomass, feeding the biomass through a press can result in an emulsion. This results in low oil yields, because the oil is trapped within the solids. One way in accordance with the methods of the invention to improve the yield in such instances is to add polysaccharide to the biomass in the form of a bulking agent, also known as a "press aid" or "pressing aid". Bulking agents are typically high fiber plant polymer additives that work by adjusting the total fiber content of the microbial biomass to an optimal range. Microbial biomass such as microalgae and the like typically have very little crude fiber content. The addition of high fiber plant polymer additives (in the form of a press aid) may help adjust the total fiber content of the microbial biomass to an optimal range for oil extraction using an expeller press to prepare biomass for a particular application. Optimal fiber content for a typical oil seed may range from 10-20%. In accordance with the methods of the present invention, it may be helpful to adjust the fiber content of the microbial biomass for optimal oil extraction or for a particular application. The range for fiber content in the biomass may be the same or a similar range as the optimal fiber content for a typical oil seed, although the optimal fiber content for each microbial biomass may be lower or higher than the optimal fiber content of a typical oil seed. Suitable pressing aids include, but are not limited to, corn starch, potato starch, cassava starch, switchgrass, rice straw, rice hulls, sugar beet pulp, sugar cane bagasse, soybean hulls, dry rosemary, cellulose, corn stover, delipidated (either pressed or solvent extracted) cake from soybean, canola, cottonseed, sunflower, jatropha seeds, paper pulp, waste paper and the like. In some embodiments, the spent microbial biomass of reduced lipid content from a previous press is used as a bulking agent. Thus, bulking agents, when incorporated into a biomass, change the physiochemical properties of the biomass so as to facilitate more uniform application of pressure to cells in the biomass.

Biomass Processing

In some embodiments, it may be desirable to further process the biomass following oil extraction. For example, the biomass may be optionally milled to further reduce particle size of the biomass. The milling step may be achieved through jet milling, hammer milling, bead milling, pearl milling, or another other form of pulverization. In some embodiments, the milled biomass has a particle size of from 0.1 to 300 microns. In some embodiments, the milled biomass has a particle size of from 0.1 to 10 microns, 1 to 8 microns, 2 to 7 microns, or 3 to 6 microns. In some embodiments, the milled biomass has a particle size of less than 10, 9, 8, 7, 6, 5, 4, 3, 2, or 1 micron. In some embodiments the milled biomass has an average particle size about 5 microns. In some embodiments the milled biomass has a particle size of from 10 to 100 microns, 100 to 200 microns, 200 to 300 microns, 300 to 400 microns or 400 to 500 microns. In some embodiments the milled biomass has a particle size of from 10 to 30 microns, 30 to 50 microns, 50 to 70 microns, 70 to 90 microns, 90 to 110 microns, 110 to 150 microns, 150 to 300 microns, or 400 to 500 microns. In some embodiments the biomass has an average particle size of greater than 50, 75, 100, 115, 125, 150, 175, 200, 225, or 250 microns (micrometer).

Biomass may be fractionated to enrich in polysaccharides or to recover proteins, nutrients or other valuable components. Fractionation may comprise washing with a solvent, especially a polar solvent such as water, ethanol or other alcohol, or mixture thereof, and centrifugation or filtration to separate soluble from insoluble fractions. Processing steps may optionally include drying or concentration to obtain biomass for use in one or more embodiments of the present invention. The drying step may be achieved through drum drying, spray drying, freeze drying, oven drying, vacuum drying, tray drying, box drying, or through another method to dry the material. Optionally, the biomass may be further milled to reduce particle size after drying or concentration.

Chemical Modification of Biomass

In an embodiment of the present invention, the microbial biomass is chemically modified through one or more chemical reactions. The modification may be a covalent modification. For example, microbial biomass can be modified through oxidation, ethylation, esterification, halogenation, amination, or carbamoylation. Ethylation reactions may be through alkylation, alkylation with alkyl and aralkyl halides and sulfates, or alkylation with alkylene oxides. Esterification may include nitration, phosphorylation and other reactions leading to phosphorus-containing biomass, sulfation, sulfonation, boration, silylation, acylation, and xanthantion. Non-limiting examples of acylation may include acetylation. Carbamoylation may be through isocyanization. Oxidation may be through epoxidation. Biomass may be chemically altered with hydrophilic moieties. The hydrophilic moieties may be anionic, cationic, zwitterionic, or neutral in charge. Anionic moieties may include carboxylates, sulfates, sulfonates, and phosphates. Cationic moieties may include amines or substituted amines. Neutral moieties may include hydroxyl or alkyl or aryl groups. In various embodiments, the microbial biomass is modified by one or more reactions selected from the group consisting of acylation, hydroxylation, epoxidation, isocyanization, and silylation.

Hydrophobic Esterification

In an embodiment of the present invention, the biomass is modified by the addition of hydrophobic moieties. For example, biomass polymers can be modified to contain hydrophobic groups by reaction with activated carbonyl-bearing molecules having both carboxylic acid groups and hydrophobic moieties. The reactive molecules may be of the form of structure 1: $R_1(C=O)R_2$ (compound 1), where $R_1$ is a leaving group and $R_2$ is a hydrophobic moiety. Nucleophilic groups of the biomass will covalently bond to the carbonyl carbon of 1. The nucleophilic groups can be hydroxyl and/or amine groups of polysaccharides, exopolysaccharides, proteins, or other biopolymers in the biomass; as a result, the biomass will be modified with the hydrophobic moieties via esterification and/or amidation reactions. Compound 1 can be an acid halide such as acetyl chloride, or an anhydride, such as acetic anhydride. Although, in part due to cost, acetylation is one embodiment (i.e., $R_2$=methyl), biomass polymers can be covalently modified to contain longer chain acid groups where $R_2$ is a 2 to 20 carbon alkyl group, preferable of 2 to 5 carbons. Structure 1 can also be an activated C8 to C20 saturated or unsaturated fatty acid, such as those produced biologically (including by the cells that produced the biomass, and further including fatty acids having tailored chain length and/or saturation profiles due to genetic engineering of the biomass). As a result of the hydrophobic modification, the biomass polymers become more resistant to solvation by water.

An illustrative procedure for acetylation of the biomass is adapted from the recipe for producing starch triacetate given in U.S. Pat. No. 3,795,670. Microalgal biomass is suspended in a solution of acetic acid and one to eight equivalents of acetic anhydride. Aqueous sodium hydroxide is added as a catalyst. The mixture is heated for about one to ten hours at 130-140° C. Acetylated biomass is purified from the mixture by cooling and pouring the cooled reaction mixture into water to separate a precipitate, which is further washed with water until the wash water achieves neutral and then dried. The resulting degree of acetylation may be in the range of 1.0 to 3.0, 1.5 to 3.0, or 1.6 to 2.5, or 0.25 to 3.0 as measured by DS value (the "degree of substitution", measured as the ratio of spectroscopic peak intensity for the functional groups vs. unmodified backbone signals), or in the range of 15% to 100% or 20% to 80% as measured by cleavage and quantification of the acetyl groups.

In an embodiment, the biomass used can be purified to remove soluble components and enrich in insoluble protein and polysaccharide containing components. For example, the biomass may be washed one or more times with a polar solvent such as ethanol or water and centrifuged prior to acetylation.

In an embodiment, the covalently modified biomass is biodegradable or compostable. In a further embodiment, the biomass is biodegradable or compostable. In a particular embodiment, the biomass is compostable according to ASTM D6400-04 Standard Specification for Compostable Plastics.

In some embodiments, the thermoplastic resin is polylactic acid (PLA). Different grades of PLA are suitable for different applications or processing conditions. Non-limiting examples of PLA grades suitable for use with the microalgal biomass of this invention include NatureWorks 2002D, 2003D, 3001D, 3051D, 3052D, 3251D, 3801X, 4032D, 4042D, 4043D, 4050D, 4060D, 6060D, 6201D, 6201D, 6204D, 6251D, 6252D, 6302D, 6350D, 6400D, 6752D, 7000D, 7001D, 7032D, 8052D, 8251D, and 8302D.

The strength of compositions blended with biomass or covalently modified biomass (alone or compounded/blended) may be further increased by the addition of fibers. Fibers may optionally be biodegradable such as may be obtained from cellulosic or woody plant materials. Rigidity (modulus) may also be improved by addition natural silicate fibers or of talc or other mineral fillers. In an embodiment, the fibers used, fiber content and processing temperature are chosen to obtain a Young's modulus of 680-6100 MPa and tensile strength of 8-46 MPa.

In an embodiment, the fibers are present in the biomass from which the covalently modified biomass is derived. The fibers may be from plant polymers used as a press-aid for the extraction of lipid or other valuable material from the cells. For example, WO2010/120939 teaches a device and method for pressing of oil from microalgae using a press-aid (also referred to therein as a "bulking agent"). The addition of fibrous pressing aids such as soy hulls helps extract lipid. These pressing aids then remain mixed with the biomass and may be further homogenized to break the pressing aids into smaller fibrous entities which when processed into a thermoplastic as previously described, will impart additional properties to the thermoplastic article formed. In an embodiment, the press-aid is present in the biomass or covalently modified biomass at a concentration of 0.1 to 30% by weight. In the case of acetylation treatment, this procedure may also acetylate fibers of the press-aid, further improving internal plasticization.

The microbial biomass, covalently modified biomass, or blended compositions may also further be blended with a cross-linking agent and/or inert fillers (e.g., calcium or zirconium salts, lignine, silicate, or aluminate). Non-limiting examples of crosslinking agents include acrylates, amides, imides, anhydrides, isocyanates, silanes, titanates, maleic anhydride, peroxides, epichlorohydrin, triallyl isocyanurate, epoxy functional products such as supplied by BASF under the trade name Joncryl®, as well as ionic crosslink agents including Surlyn® provided by DuPont. Crosslinking may optionally be achieved through exposure to ultraviolet wavelengths.

The microbial biomass, covalently modified biomass, or blended compositions may also further be blended with surfactants. As described here a surfactant is a compound such as a detergent or wetting agent that affects the surface tension of a fluid. Non-limiting examples of surfactants suitable for use with embodiments of this invention include glyceryl monostearate, ethoxylated dimethylsiloxane, polyoxyethylene, propylene oxide, organic sulfates, organic sulfonates, alkyl polyglycosides, and polyolefin glycols.

The microbial biomass, covalently modified biomass, or blended compositions may also further be blended with antioxidants. Non-limiting examples of antioxidants suitable for use with embodiments of this invention are those such as supplied by Chemtura under the trade names ANOX®, ULTRANOX®, ALKNOX®, and NAUGARD® as well as those supplied by BASF under the trade name Iragfos®. In an embodiment, addition of one or more antioxidant to a thermoplastic blend comprising microbial biomass may increase the operating temperature of the composition. In a further embodiment, addition of one or more antioxidant to a thermoplastic blend comprising microbial biomass may decrease darkening of the thermoplastic composition.

In an embodiment, the specific gravity of a composition prepared through blending one or more thermoplastic polymers with microbial biomass or covalently modified biomass does not increase or does not significantly increase. Low or no increases in specific gravity is a desirable benefit for applications requiring light weight component parts, such as automobile components and casings for electronic equipment. In some embodiments the specific gravity of a thermoplastic or thermoset composition increases by less than 10%, less than 5%, less than 2%, or less than 1% when as much as 5%, 10%, 15%, 20%, 25%, 30%, 35%, 40%, 45%, or 50% by weight of a thermoplastic polymer is replaced with single-celled oleaginous microbial biomass, such as microalgal biomass, to form a blend.

Articles may be melt processed using the thermoplastic compositions. For example, articles may be injection molded, compression molded, blow molded, thermoformed, coated onto paper, rotomolded, fused molded, or made by cast-film or blown-film methods. Articles may be used in laminating or in baked-on coating. Articles may be spun such as by melt spinning, rotary jet spinning, electrospinning, ring spinning or through other methods known in the art.

The biomass and the compositions or articles made with the biomass may be biodegradable or compostable in accordance with one or more of the following standards: ASTM D6400-04, ASTM D7071-05, ASTM D5988-03, ASTM D5511-11, ASTM D6954-04, ASTM 7475-11, ISO 1485502; 2007, ISO 14853:2005, ISO 14855-1:2005.

In some embodiments, the glass transition temperature of the acetylated biomass or blends thereof may be above 50° C., above 60° C., above 75° C. above 100° C., or above 140° C. (especially for acetylated washed biomass). The degradation temperature at 10% loss of weight may be above 230° C., preferably above 250° C., and preferably above 300° C. In the case of acetylated washed algae the degradation temperature may be about 290° C., about 305° C., or about 315° C.

In some embodiment, heterotrophic oleaginous microalgae are cultivated, then pressed with press aids to remove oil and the resulting biomass containing press aid fibers is compounded with a thermoplastic or thermoset resin. In a further embodiment, heterotrophic oleaginous microalgae are cultivated, pressed with press aids to remove oil, the resulting biomass containing press aid fibers is covalently modified, and the covalently modified biomass is compounded with a thermoplastic or thermoset resin.

More generally, an embodiment of the present invention features cultivating oleaginous microalgae, obtaining oil from the microalgae optionally using a press aid, homogenizing the biomass and producing a wood plastic composite from the biomass. The wood plastic production step may use techniques disclosed here or those known in the art, such as combining microalgal biomass with a thermoplastic polymer and optionally a compatibilizing agent in an intensity mixer, e.g. a ribbon blender or any low intensity mixer commonly used in blending solids. The mixture can be processed in a heated extruder at temperatures suitable for processing the particular thermoplastic polymer chosen. In another method a master batch composition can be prepared from about 50 to about 99% or about 75 to about 90% weight of microalgal biomass and from about 1 to 5%, or about 5 to about 10%, or about 10 to about 25% of a compatibilizer or a thermoplastic resin. The resulting master batch can be blended with a thermoplastic polymer or mixture of thermoplastic polymers to obtain composites having the same range of compositions as those prepared by direct blending of the ingredients. The master batch method provides a supply that can be prepared, stored and subsequently used to react with any chosen thermoplastic polymer. Master batching also provides a method for supplying concentrated additives in pellet form.

In preparing thermoplastic compositions, it may be difficult to add a large amount of biomass to the feed during compounding. In order to overcome this problem, a master batch may be prepared by mixing biomass with a polymer or a compatibilizing agent in a batch-type mixer or compression molding machine. Pellets comprising high levels of biomass may be fashioned through the use of a pelletizer or pellet mill.

In some embodiment, the biomass reduces or eliminates conventional wood plastic lubricants such as ethylene bis-stearamide (EBS), metal stearates, and lubricants supplied by Struktol Company of America under the trade name STRUKTOL®. Accordingly the composites provided herein can contain reduced amounts of such lubricants.

In an additional embodiment of the invention, the biomass includes a certain percentage of triglyceride. The optional triglyceride recovery step in the biomass processing method is not performed, or it is partially performed. Where it is partially performed, the recovered triglyceride amounts to less than 2.5% of the biomass dry cell weight. In certain cases, the recovered triglyceride amounts to less than 0.25%, 0.5%, 1%, 5%, 10%, 15%, 20%, 25%, 30%, 35%, 40%, 45%, 50%, 60%, 70%, 80%, or 90% of the dry cell weight.

EXAMPLES

Example 1

Wood Plastic Composite Compositions Comprising Microalgal Biomass

This example describes the use of biomass prepared from oleaginous microalgae to replace a processing lubricant in the production of wood plastic composite compositions. A genetically engineered derivative of *Prototheca moriformis* (UTEX 1435) was cultivated under heterotrophic conditions such as those described in WO2008/151149, WO2010/063032, and WO2011/150411, dried, then mechanically pressed to extract oil. Soybean hulls, used as a press aid in the extraction process, were added at 15% dry weight. The resulting microalgal biomass with soybean hull plant polymers retained 7.2% residual oil. The biomass preparation, referred to as microalgal biomass A1, was milled to a final average particle size of 425 micrometers prior to compounding.

Compositions of wood plastic composites were produced comprising resin, wood flour, and optionally maleic anhydride grafted resin (MAPE or MAPP) according to the weight-based formulations given in Table IV. Zinc stearate or microalgal biomass was used as a lubricant component of the indicated formulation. Resins evaluated included high density polyethylene (HDPE, Marlex 6007, Chevron Phillips Chemical Company) and polypropylene (PP, ExonnMobil 5262). Compounds were produced using a 26 mm co-rotating twin-screw extruder heated to 180° C. with resin fed in the feed throat and microalgal biomass side-stuffed downstream. Flexural test bars were generated with an Engle 85 Injection Moulding Machine. Mechanical, physical, and water absorbent properties were tested according to ASTM standards (e.g. flexural strength ASTM D790, tensile strength/elongation ASTM D638, notched/unotched izod ASTM D256). Results from these tests are shown in Table V.

TABLE IV

Weight % formulations of materials to produce wood plastic composite compositions

| | Weight % | | | | | | |
|---|---|---|---|---|---|---|---|
| Sample | PP | HDPE | Wood Flour | Microalgal biomass A1 | MAPE | MAPP | Zinc Stearate |
| 1-1 | 46 | 0 | 50 | 0 | 0 | 0 | 4 |
| 1-2 | 46 | 0 | 50 | 4 | 0 | 0 | 0 |
| 1-3 | 44 | 0 | 50 | 0 | 2 | 0 | 4 |
| 1-4 | 44 | 0 | 50 | 4 | 2 | 0 | 0 |
| 1-5 | 0 | 46 | 50 | 0 | 0 | 0 | 4 |
| 1-6 | 0 | 46 | 50 | 4 | 0 | 0 | 0 |
| 1-7 | 0 | 44 | 50 | 0 | 0 | 2 | 4 |
| 1-8 | 0 | 44 | 50 | 4 | 0 | 2 | 0 |

TABLE V

Mechanical, Physical, and Water Absorbent Properties of Wood Plastic Composite Compositions prepared with microalgal biomass.

| | | Wood Plastic Composite Composition Sample | | | | | | | |
|---|---|---|---|---|---|---|---|---|---|
| | | 1-1 | 1-2 | 1-3 | 1-4 | 1-5 | 1-6 | 1-7 | 1-8 |
| Flexural Strength (psi) | Average | 7020 | 6800 | 8290 | 10800 | 5200 | 5670 | 6580 | 10400 |
| | St. Dev. | 60.1 | 67.4 | 92.9 | 273 | 129 | 297 | 141 | 169 |
| Flexural Modulus (psi) | Average | 572000 | 557000 | 604000 | 611000 | 572000 | 567000 | 595000 | 629000 |
| | St. Dev. | 11000 | 4710 | 23000 | 16600 | 23500 | 8830 | 31300 | 49000 |
| Notched Izod (ft-lb/in), complete break | Average | | | 0.613 | 0.731 | | | 0.682 | 1.027 |
| | St. Dev. | | | 0.030 | 0.026 | | | 0.021 | 0.037 |
| Notched Izod (ft-lb/in), hinged break | Average | 0.666 | 0.682 | | | 0.812 | 0.666 | | |
| | St. Dev. | 0.019 | 0.043 | | | 0.041 | 0.056 | | |
| Unnotched Izod (ft-lb/in), complete break | Average | 1.903 | 1.828 | 1.881 | 3.197 | | | 1.222 | 3.828 |
| | St. Dev. | 0.143 | 0.145 | 0.250 | 0.301 | | | 0.019 | 0.401 |
| Unnotched Izod (ft-lb/in), hinged break | Average | | | | | 1.550 | 1.527 | | |
| | St. Dev. | | | | | 0.259 | 0.156 | | |
| Specific Gravity | Average | 1.112 | 1.099 | 1.118 | 1.122 | 1.115 | 1.126 | 1.126 | 1.141 |
| | St. Dev. | 0.001 | 0.002 | 0.003 | 0.012 | 0.002 | 0.002 | 0.004 | 0.001 |
| % Weight Change at 24 hrs | Average | 0.675 | 1.014 | 0.723 | 0.801 | 1.348 | 1.586 | 1.071 | 0.960 |
| % Weight Change at 48 hrs | Average | 1.006 | 1.400 | 0.941 | 1.127 | 1.812 | 2.201 | 1.319 | 1.238 |
| % Weight Change at 72 hrs | Average | 1.106 | 1.786 | 1.160 | 1.410 | 2.121 | 2.692 | 1.517 | 1.367 |
| % Weight Change at 96 hrs | Average | 1.624 | 2.863 | 1.534 | 2.180 | 3.006 | 4.186 | 1.981 | 1.847 |
| % Weight Change at 168 hrs | Average | 1.687 | 3.249 | 1.696 | 2.410 | 3.154 | 4.739 | 2.161 | 1.952 |

The data presented in Table V show that wood plastic composite compositions prepared with microalgal biomass exhibit comparable tensile and impact properties to those prepared with added zinc stearate. The mechanical and physical properties of compositions comprising microalgal biomass A1 are within 10% of tensile strength, tensile modulus, unnotched izod, and specific gravity of those of formulations made with added zinc stearate.

Mechanical and water resistant properties of wood plastic composite formulations comprising microalgal biomass are improved with addition of MAPE or MAPP. Formulations comprising microalgal biomass and resin-appropriate coupling agent showed improved flexural and impact strength relative to those comprising added zinc stearate. HDPE preparations comprising microalgal biomass and MAPE showed improved water resistance compared to those prepared with added zinc stearate.

This example demonstrates the successful use of microalgal biomass to substitute for added zinc stearate to maintain or improve the mechanical and water resistant properties of wood plastic composite compositions.

Example 2

Wood Plastic Composite Compositions Comprising Microalgal Biomass

This example describes the use of biomass prepared from oleaginous microalgae to replace different processing lubricants in the production of wood plastic composite compositions. Genetically engineered derivatives of *Prototheca moriformis* (UTEX 1435) were cultivated under heterotrophic conditions such as those described in WO2008/151149, WO2010/063032, and WO2011/150411, dried, then mechanically pressed to extract oil. Three different microalgal biomass samples, B1, C1, and D1, were prepared through pressing strains of *Prototheca moriformis* with soybean hulls added at the weight percentages shown in Table VI. Preparation B1 was treated with hexane to further remove residual oil. The resulting biomass preparations were milled to a final average particle size of 250-425 micrometers.

TABLE VI

Microalgal Biomass Preparations used in compounding thermoplastic compositions

| Microalgal Biomass Sample | % Residual Oil Content | Extraction Method | Soybean Hull % addition |
|---|---|---|---|
| B1 | <2 | mechanical, hexane | 0 |
| C1 | 9.2 | mechanical | 15 |
| D1 | 12.2 | mechanical | 35 |

Compositions of wood plastic composites were produced comprising different amounts of high density polyethylene (HDPE, Marlex 6007, Chevron Phillips Chemical Company), recycled resin, wood flour, talc, and maleic anhydride grafted polyethylene according to the weight-based formulations given in Table VII. Zinc stearate, Struktol TPW-104, or microalgal biomass preparations were used as lubricating components of the indicated formulation. Compositions were produced using a 26 mm co-rotating twin-screw extruder heated to 180° C. with resin fed in the feed throat and microalgal biomass side-stuffed downstream. Flexural test bars were generated with an Engle 85 Injection Moulding Machine. Mechanical, physical, and water absorbent properties were tested according to ASTM standards. Results from these tests are shown in Table VIII and IX.

TABLE VII

Weight % formulations of materials to produce wood plastic composite compositions

| | | | | | Microalgal Biomass | | | | | |
|---|---|---|---|---|---|---|---|---|---|---|
| Sample | HDPE | Recycled HDPE | Wood Flour | Talc | B1 | C1 | D1 | MAPE | Zinc Stearate | Struktol TPW-104 |
| 2-1 | 46 | 0 | 50 | 0 | 0 | 0 | 0 | 0 | 4 | 0 |
| 2-2 | 46 | 0 | 50 | 0 | 4 | 0 | 0 | 0 | 0 | 0 |
| 2-3 | 46 | 0 | 50 | 0 | 0 | 4 | 0 | 0 | 0 | 0 |
| 2-4 | 46 | 0 | 50 | 0 | 0 | 0 | 4 | 0 | 0 | 0 |
| 2-5 | 44 | 0 | 50 | 0 | 0 | 0 | 0 | 2 | 4 | 0 |
| 2-6 | 44 | 0 | 50 | 0 | 4 | 0 | 0 | 2 | 0 | 0 |
| 2-7 | 44 | 0 | 50 | 0 | 0 | 4 | 0 | 2 | 0 | 0 |
| 2-8 | 44 | 0 | 50 | 0 | 0 | 0 | 4 | 2 | 0 | 0 |
| 2-9 | 22.2 | 22.2 | 49.4 | 0 | 0 | 0 | 0 | 0 | 0 | 6.2 |
| 2-10 | 22.2 | 22.2 | 49.4 | 0 | 6.2 | 0 | 0 | 0 | 0 | 0 |
| 2-11 | 22.2 | 22.2 | 49.4 | 0 | 0 | 6.2 | 0 | 0 | 0 | 0 |
| 2-12 | 22.2 | 22.2 | 49.4 | 0 | 0 | 0 | 6.2 | 0 | 0 | 0 |
| 2-13 | 15.1 | 15.1 | 50.4 | 14.9 | 0 | 0 | 0 | 0 | 0 | 4.5 |
| 2-14 | 15.1 | 15.1 | 50.4 | 14.9 | 4.5 | 0 | 0 | 0 | 0 | 0 |
| 2-15 | 15.1 | 15.1 | 50.4 | 14.9 | 0 | 4.5 | 0 | 0 | 0 | 0 |
| 2-16 | 15.1 | 15.1 | 50.4 | 14.9 | 0 | 0 | 4.5 | 0 | 0 | 0 |
| 2-17 | 14.1 | 14.1 | 50.4 | 14.9 | 0 | 0 | 4.5 | 2 | 0 | 0 |

TABLE VIII

Mechanical and Water Absorbent Properties of Wood Plastic Composite Compositions prepared with microalgal biomass.

| | | Wood Plastic Composite Composition Sample | | | | | | | |
|---|---|---|---|---|---|---|---|---|---|
| | | 2-1 | 2-2 | 2-3 | 2-4 | 2-5 | 2-6 | 2-7 | 2-8 |
| Flexural Strength (psi) | Average | 5280 | 5690 | 5470 | 5200 | 6250 | 10100 | 9940 | 10100 |
| | St. Dev. | 192 | 139 | 113 | 141 | 102 | 198 | 181 | 250 |
| Flexural Modulus (psi) | Average | 603000 | 577000 | 574000 | 589000 | 608000 | 632000 | 592000 | 624000 |
| | St. Dev. | 12200 | 19500 | 17300 | 14600 | 25600 | 13700 | 12400 | 14300 |
| Unnotched Izod (ft-lb/in), complete break | Average | | | | | 1.270 | 3.821 | 4.154 | 3.866 |
| | St. Dev. | | | | | 0.236 | 0.398 | 0.426 | 0.269 |
| Unnotched Izod (ft-lb/in), hinged break | Average | 1.772 | 1.906 | 1.565 | 1.506 | | | | |
| | St. Dev. | 0.303 | 0.632 | 0.199 | 0.236 | | | | |
| Specific Gravity | Average | 1.118 | 1.123 | 1.136 | 1.138 | 1.129 | 1.149 | 1.133 | 1.147 |
| | St. Dev. | 0.000 | 0.003 | 0.003 | 0.009 | 0.005 | 0.002 | 0.023 | 0.003 |
| % Weight Change at 24 hrs | Average | 1.208 | 1.355 | 1.557 | 1.614 | 1.101 | 0.895 | 1.037 | 0.971 |
| % Weight Change at 48 hrs | Average | 1.627 | 2.077 | 2.153 | 2.322 | 1.484 | 1.285 | 1.377 | 1.332 |
| % Weight Change at 72 hrs | Average | 1.766 | 2.211 | 2.622 | 2.651 | 1.642 | 1.315 | 1.420 | 1.332 |
| % Weight Change at 96 hrs | Average | 2.015 | 2.411 | 3.085 | 3.203 | 1.685 | 1.550 | 1.577 | 1.561 |
| % Weight Change at 168 hrs | Average | 2.689 | 3.620 | 4.678 | 5.021 | 2.293 | 1.952 | 2.063 | 2.019 |

TABLE IX

Mechanical and Water Absorbent Properties of Wood Plastic Composite Compositions prepared with microalgal biomass.

| | | Wood Plastic Composite Composition Sample | | | | | | | | |
|---|---|---|---|---|---|---|---|---|---|---|
| | | 2-9 | 2-10 | 2-11 | 2-12 | 2-13 | 2-14 | 2-15 | 2-16 | 2-17 |
| Flexural Strength (psi) | Average | 4320 | 3820 | 3800 | 4390 | 4380 | 5560 | 4610 | 4410 | 5630 |
| | St. Dev. | 106 | 192 | 326 | 195 | 95.8 | 165 | 87.5 | 660 | 237 |
| Flexural Modulus (psi) | Average | 547000 | 487000 | 467000 | 528000 | 740000 | 829000 | 797000 | 705000 | 797000 |
| | St. Dev. | 17900 | 37300 | 13800 | 30000 | 48000 | 25900 | 15200 | 95400 | 21700 |
| Unnotched Izod (ft-lb/in), complete break | Average | | | | | 0.800 | 0.786 | 0.845 | 0.903 | 1.109 |
| | St. Dev. | | | | | 0.116 | 0.222 | 0.282 | 0.152 | 0.339 |
| Unnotched Izod (ft-lb/in), hinged break | Average | 1.461 | 1.204 | 1.197 | 1.344 | | | | | |
| | St. Dev. | 0.276 | 0.303 | 0.253 | 0.488 | | | | | |
| Specific Gravity | Average | 1.120 | 1.143 | 1.122 | 1.145 | 1.267 | 1.244 | 1.305 | 1.306 | 1.309 |
| | St. Dev. | 0.003 | 0.018 | 0.009 | 0.002 | 0.005 | 0.006 | 0.008 | 0.008 | 0.005 |
| % Weight Change at 24 hrs | Average | 1.445 | 1.192 | 1.130 | 1.172 | 1.406 | 1.781 | 1.453 | 1.528 | 1.293 |
| % Weight Change at 48 hrs | Average | 1.885 | 1.642 | 1.626 | 1.578 | 1.925 | 2.573 | 2.030 | 2.157 | 1.875 |
| % Weight Change at 72 hrs | Average | 2.129 | 1.863 | 1.823 | 1.698 | 2.125 | 2.967 | 2.375 | 2.458 | 1.998 |

TABLE IX-continued

Mechanical and Water Absorbent Properties of Wood Plastic Composite Compositions prepared with microalgal biomass.

| | | Wood Plastic Composite Composition Sample | | | | | | | | |
|---|---|---|---|---|---|---|---|---|---|---|
| | | 2-9 | 2-10 | 2-11 | 2-12 | 2-13 | 2-14 | 2-15 | 2-16 | 2-17 |
| % Weight Change at 96 hrs | Average | 2.462 | 2.132 | 2.146 | 1.943 | 2.466 | 3.477 | 2.767 | 2.816 | 2.307 |
| % Weight Change at 168 hrs | Average | 3.538 | 2.989 | 3.132 | 2.863 | 3.588 | 5.300 | 4.127 | 3.975 | 3.414 |

The data presented in Table VIII show that wood plastic composite compositions prepared with microalgal biomass types differing in oil content exhibit comparable tensile and impact properties to those prepared with added zinc stearate. The mechanical and physical properties of compositions comprising microalgal biomass B1, C1, or D1 and are within 10% of tensile strength, tensile modulus, unnotched izod, and specific gravity of those of formulations made with added zinc stearate but lacking microalgal biomass.

The data presented in Table IX show that wood plastic composite compositions prepared with microalgal biomass exhibit comparable tensile and impact properties to those prepared with the lubricant package Struktol TPW 104. The mechanical and physical properties of compositions comprising microalgal biomass D1 is within 10% of tensile strength, tensile modulus, unnotched izod, and specific gravity of those of formulations made with Struktol TPW 104 but lacking microalgal biomass.

Mechanical and water resistant properties of wood plastic composite formulations comprising microalgal biomass were improved with addition of MAPE. Formulations comprising microalgal biomass and MAPE compatibilizer showed improved flexural and impact strength relative to those comprising added zinc stearate and to Struktol TPW 104. HDPE preparations comprising microalgal biomass and MAPE also exhibited improved water resistance relative to those prepared with added zinc stearate and to Struktol TPW 104.

This example demonstrates the successful use of microalgal biomass to substitute for added zinc stearate or to Struktol TPW 104 to maintain or improve the mechanical and water resistant properties of wood plastic composite compositions.

Example 3

Wood Plastic Composite Compositions Comprising Microalgal Biomass

This example describes the use of biomass prepared from oleaginous microalgae to replace zinc stearate in the extrusion of wood plastic composite compositions. Compositions were prepared according to the sample formulations 2-1 through 2-8 listed in Table VII. Compositions were profile extruded using a miniature wood plastic composite board die setup with a Brabender profile extruder heated to 187° C. The screw speed was set at 50 rpm.

Photographs of the extruded samples 2-1 through 2-8 are shown in FIG. 1. The substitution of zinc stearate with microalgal biomass generated equivalent profiles.

These data demonstrate that microalgal biomass comprising different oil levels are able to replace zinc stearate in extruded wood plastic composite compositions.

Example 4

Extruded Wood Plastic Composite Compositions Comprising Microalgal Biomass

This example describes the use of microalgal biomass in the production of wood plastic composite compositions to decrease the amount of thermoplastic resin or wood flour in formulations. A genetically engineered derivative of *Prototheca moriformis* (UTEX 1435) was cultivated under heterotrophic conditions such as those described in WO2008/151149, WO2010/063032, and WO2011/150411, dried, then mechanically pressed with soybean hulls added at 30% by weight to extract oil. Sucrose was used as the carbon source in the fermentation broth. The resulting microalgal biomass with soybean hull plant polymers retained 6.5% residual oil. The biomass preparation, referred to as microalgal biomass E1, was milled to a final average particle size of 425 micrometers prior to compounding.

Compositions of wood plastic composites were produced through combining resin, recycled resin, wood flour, lubricant, and microalgal biomass according to the weight-based formulations given in Table X then were either injection molded or extruded. Pellets for injection molded forms were produced using a 26 mm co-rotating twin-screw extruder heated to 180° C. with resin fed in the feed throat and microalgal biomass side-stuffed downstream. Injection molded flexural and tensile test bars were generated with an Engle 85 Injection Moulding Machine. Mechanical and physical properties were tested according to ASTM standards. Results from these tests are shown in Table XI.

Figure 2:
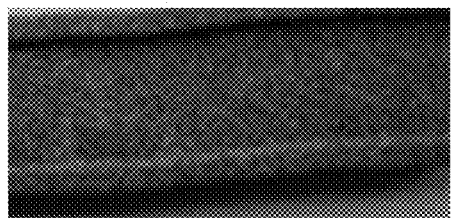
FIG. 2 shows extruded profiles of wood plastic composite compositions in connection with biomass in an embodiment of the compositions as illustrated in Example 4.
Figure 2:
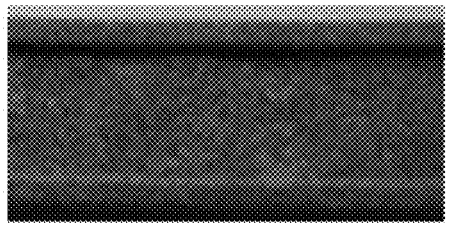
Figure 2:
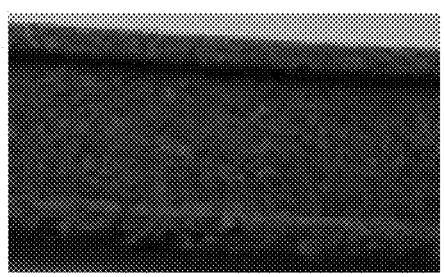
Figure 2:
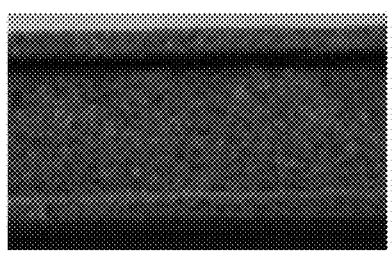
Figure 2:
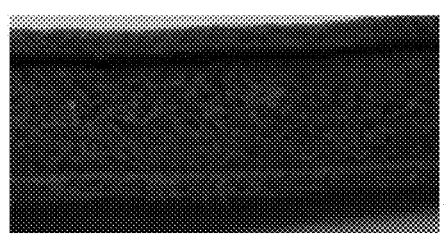
Figure 2:
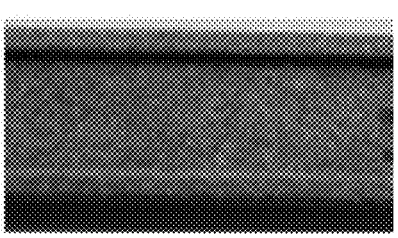
Figure 2:
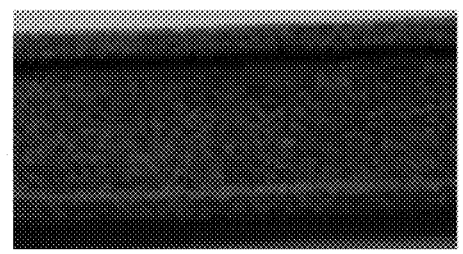
Figure 2:
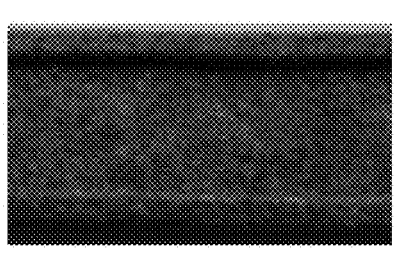

Separately, extruded profile compositions were generated upon blending and gravimetrically feeding materials into a conical twin screw Brabender profile extruder equipped with a miniature wood plastic composite board die of railroad geometry. Three zones of the extruder and the die were heated to 180° C. The screw speed was set at 100 rpm. Photographs of the extruded samples 4-1 through 4-8 are shown in FIG. 2. The substitution of thermoplastic resin or wood flour with microalgal biomass generated extruded profiles that were visually equivalent to those prepared without microalgal biomass. These data successfully demonstrate that microalgal biomass is able to replace thermoplastic resin, wood flour, or combinations of resin and wood flour in formulations of extruded wood plastic composites.

TABLE X

Weight % formulations of materials to produce wood plastic composite compositions

| Sample | Microalgal biomass | HDPE | Recycled HDPE | Maple Flour | Struktol TPW-104 |
|---|---|---|---|---|---|
| 4-1 | 0 | 22.2 | 22.2 | 49.4 | 6.2 |
| 4-2 | 20 | 22.2 | 22.2 | 29.4 | 6.2 |
| 4-3 | 49.4 | 22.2 | 22.2 | 0 | 6.2 |
| 4-4 | 20 | 21.3 | 21.3 | 29.4 | 8 |
| 4-5 | 4 | 20.2 | 20.2 | 49.4 | 6.2 |
| 4-6 | 8 | 18.2 | 18.2 | 49.4 | 6.2 |
| 4-7 | 12 | 16.2 | 16.2 | 49.4 | 6.2 |
| 4-8 | 30 | 16 | 16 | 30 | 8 |

TABLE XI

Mechanical Properties of Injection Molded Wood Plastic Composite Compositions prepared with Microalgal Biomass

| | | 4-1 | 4-2 | 4-3 | 4-4 | 4-5 | 4-6 | 4-7 | 4-8 |
|---|---|---|---|---|---|---|---|---|---|
| Tensile Strength (psi) | Average | 1740 | 1380 | 1100 | 1350 | 1760 | 1550 | 1360 | 1170 |
| | St. Dev. | 81 | 30 | 20 | 51 | 89 | 38 | 50 | 54 |
| Elongation (%) | Average | 0.7 | 1.23 | 6.66 | 2.22 | 1.31 | 1.04 | 0.87 | 1.38 |
| | St. Dev. | 0.24 | 0.11 | 0.62 | 0.29 | 0.3 | 0.16 | 0.09 | 0.23 |
| Tensile Modulus (psi) | Average | 628000 | 544000 | 290000 | 431000 | 587000 | 545000 | 534000 | 463000 |
| | St. Dev. | 30700 | 57800 | 13100 | 26800 | 32100 | 64800 | 98900 | 46000 |
| Flexural Strength (psi) | Average | 3930 | 3050 | 2430 | 3160 | 4030 | 3530 | 3130 | 2790 |
| | St. Dev. | 251 | 100 | 99 | 50 | 227 | 194 | 94 | 29 |
| Flexural Modulus (psi) | Average | 537000 | 467000 | 280000 | 462000 | 552000 | 548000 | 542000 | 470000 |
| | St. Dev. | 49500 | 6960 | 15400 | 12000 | 21600 | 20500 | 26600 | 25400 |
| Notched Izod (ft-lb/in) | Average | 0.716 | 0.785 | 0.768 | 0.715 | 0.74 | 0.55 | 0.524 | 0.6 |
| | St. Dev. | 0.131 | 0.077 | 0.060 | 0.078 | 0.069 | 0 | 0.042 | 0.067 |
| Unnotehed Izod (ft-lb/in) | Average | 1.26 | 1.36 | 1.831 | 0.874 | 1.480 | 1.1305 | 0.9326 | 1.0206 |
| | St. Dev. | 0.243 | 0.186 | 0.203 | 0.103 | 0.203 | 0.052 | 0.109 | 0.073 |

Example 5

Compression Molded Compositions Comprising Microalgal Biomass

This example describes the use of compression molding to produce compositions with microalgal biomass. A genetically engineered derivative of *Prototheca moriformis* (UTEX 1435) was cultivated under heterotrophic conditions such as those described in WO2008/151149, WO2010/063032, and WO2011/150411, dried, then mechanically pressed to extract oil. Glucose was used as the carbon source in the fermentation broth. Soybean hulls, used as a press aid in the extraction process, were added at 35% dry weight. The resulting microalgal biomass with soybean hull plant polymers retained 12.2% residual oil. The biomass preparation, referred to as microalgal biomass D1, was milled to a final average particle size of 425 micrometers prior to compounding.

Microalgal biomass D1 and different binders were combined according to the weight percentages listed in Table XII. Samples were pressed into a square plaque shape using a plate press according to the temperatures, pressures, and times listed in Table XIII. Compression molded plaques were visually evaluated for physical appearance, consistency and strength.

TABLE XII

Weight percent formulations used in making compression molded compositions

| Sample | Microalgal biomass D1 | Recycled HDPE | Corn Starch | Potato Starch | Glycerin | Phenolic Resin | Acrylic Acid | Water |
|---|---|---|---|---|---|---|---|---|
| 5-1 | 100 | | | | | | | |
| 5-2 | 100 | | | | | | | |
| 5-3 | 95 | | | 5 | | | | |
| 5-4 | 95 | 5 | | | | | | |
| 5-5 | 85 | | | 5 | | | | 10 |
| 5-6 | 85 | | 5 | | | | | 10 |
| 5-7 | 80 | | | 10 | | | | 10 |
| 5-8 | 100 | | | | | | | |
| 5-9 | 80 | | | 10 | | | | 10 |
| 5-10 | 80 | | | 10 | 10 | | | |

TABLE XII-continued

Weight percent formulations used in making compression molded compositions

| | Weight Percent | | | | | | | |
|---|---|---|---|---|---|---|---|---|
| Sample | Microalgal biomass D1 | Recycled HDPE | Corn Starch | Potato Starch | Glycerin | Phenolic Resin | Acrylic Acid | Water |
| 5-11 | 80 | | | 10 | | | | 10 |
| 5-12 | 80 | | | 10 | 10 | | | |
| 5-13 | 90 | | | | | 10 | | |
| 5-14 | 70 | | | 20 | | | | 10 |
| 5-15 | 70 | 10 | | 10 | | | | 10 |
| 5-16 | 80 | | | 10 | | | 5 | 5 |

TABLE XIII

Conditions used in making compression molded compositions

| Sample | Weight (lbs) | Temp (C.) | Pressure (Tons) | Dwell Time (minutes) | Hold (minutes) | Finished Appearance |
|---|---|---|---|---|---|---|
| 5-1 | 80 | 25 | 10 | 2 | 2 | Poor, crumbled |
| 5-2 | 80 | 25 | 20 | 2 | 2 | Poor, crumbled |
| 5-3 | 80 | 25 | 20 | 2 | 2 | Poor, crumbled |
| 5-4 | 80 | 25 | 20 | 2 | 2 | Poor, crumbled |
| 5-5 | 80 | 70 | 20 | 2 | 2 | Good, soft, solid |
| 5-6 | 80 | 70 | 20 | 2 | 4 | Good, soft, solid |
| 5-7 | 80 | 70 | 20 | 2 | 2 | Good, soft, solid |
| 5-8 | 90 | 70 | 20 | 2 | 2 | Good, hard, brittle |
| 5-9 | 90 | 120 | 20 | 2 | 2 | Good, soft, crumbling at edges |
| 5-10 | 90 | 120 | 20 | 2 | 2 | Good, hard, solid, bubble |
| 5-11 | 90 | 160 | 20 | 2 | 2 | Good, hard, cracks |
| 5-12 | 90 | 160 | 20 | 2 | 2 | Poor, flakes, not solid |
| 5-13 | 90 | 160 | 20 | 2 | 2 | Very Good, hard but not brittle |
| 5-14 | 90 | 160 | 20 | 2 | 2 | Good, brittle, bubbles |
| 5-15 | 90 | 160 | 20 | 2 | 2 | Very poor |
| 5-16 | 90 | 160 | 20 | 2 | 2 | Good, hard, cracks |

The data presented in Table XIII identify combinations of binders and processing conditions that are successful in producing compression molded articles made with greater than 70% microalgal biomass.

Example 6

Thermoplastic Compositions Prepared with Biomass from Photosynthetically and Heterotrophically Grown Microalgae This example describes the use of biomass prepared from microalgae to produce thermoplastic compositions. Strains of microalgae were selected with differentiated levels of color generating compounds. *Chlorella protothecoides* (UTEX 250) and genetically engineered derivatives of *Prototheca moriformis* (UTEX 1435), low or lacking in chlorophyll, were cultivated under heterotrophic conditions such as those described in WO2008/151149, WO2010/063032, and WO2011/150411. Glucose was used as the carbon source in the fermentation broth. These biomass samples were white to brown in color. Commercial samples of *Chlorella vulgaris* and *Spirulina* powders were obtained from Nuts.com (Cranford, N.J.). *Chlorella vulgaris* and *Spirulina* powders were dark green in appearance due to the higher relative concentration of chlorophyll and other color generating compounds. The product information as of the date of filing assigns the *Chlorella vulgaris* powder to a Korean source with heterotrophic production and assigns the *Spirulina* powder to photosynthetic production. Compositional analyses of the different microalgal biomass samples are presented in Table XIV.

TABLE XIV

Percent moisture, protein, fat, ash and carbohydrate of different microalgal biomass samples

| Microalgal Biomass Sample | Moisture | Protein | Fat | Ash | Carbohydrate |
|---|---|---|---|---|---|
| *Prototheca moriformis* (UTEX 1435) | 5.19 | 10.5 | 7.2 | 5.3 | 71.71 |
| *Chlorella protothecoides* (UTEX 250) | 4.3 | 12.5 | 2.2 | 11.6 | 69.4 |
| *Chlorella vulgaris* | 6.2 | 62.22 | 11.5 | 5.2 | 14.8 |
| *Spirulina* | 7.1 | 65.45 | 4.55 | 6.18 | 16.7 |

Thermoplastic pellets were compounded using a 26 mm co-rotating twin-screw extruder heated to 180° C. Marlex 6007 high density polyethylene resin was added at 60% by weight fed in the feed throat and microalgal biomass, added at 40% by weight, was side-stuffed downstream. Injection molded flexural and tensile test bars were generated from these pellets with an Engle 85 Injection Moulding Machine. Mechanical and physical properties of thermoplastic samples were tested according to ASTM standards. Results for each sample are presented in Table XV.

TABLE XV

Mechanical Properties of Injection Molded Thermoplastic Compositions Comprising Different Microalgal Biomass Preparations

| | | Prototheca moriformis (UTEX 1435) | Chlorella protothecoides (UTEX 250) | Chlorella vulgaris | Spirulina |
|---|---|---|---|---|---|
| Tensile Strength (psi) | Average | 2080 | 2380 | 1810 | 2150 |
| | St. Dev. | 15 | 28.7 | 9 | 74 |
| Elongation (%) | Average | 12.07 | 8.35 | 8.86 | 6.57 |
| | St. Dev. | 0.86 | 0.31 | 0.59 | 1.34 |
| Tensile Modulus (psi) | Average | 229000 | 222000 | 226000 | 265000 |
| | St. Dev. | 7680 | 14300 | 5980 | 11200 |
| Flexural Strength (psi) | Average | 3640 | 3950 | 3900 | 4510 |
| | St. Dev. | 33 | 80 | 37 | 278 |
| Flexural Modulus (psi) | Average | 220000 | 187000 | 212000 | 256000 |
| | St. Dev. | 2520 | 5640 | 2370 | 5020 |
| Notched Izod (ft-lb/in) | Average | 1.393 | 1.380 | 1.027 | 1.266 |
| | St. Dev. | 0.085 | 0.080 | 0.083 | 0.094 |
| Unnotched Izod (ft-lb/in) | Average | 5.853 | 6.160 | 3.325 | 2.445 |
| | St. Dev. | 0.953 | 0.550 | 0.650 | 0.286 |
| Specific Gravity | Average | 1.080 | 1.080 | 1.020 | 1.065 |
| | St. Dev. | 0.000 | 0.000 | 0.001 | 0.002 |
| L* | Average | 37.70 | 46.70 | 22.61 | 19.71 |
| | St. Dev. | | 0.24 | 2.29 | 1.21 |
| a* | Average | 9.03 | 8.13 | 0.13 | 0.33 |
| | St. Dev. | | 0.05 | 0.09 | 0.06 |
| b* | Average | 17.11 | 19.20 | 5.40 | 5.88 |
| | St. Dev. | | 0.14 | 1.24 | 1.14 |

As shown in Table XV, the mechanical and physical properties of injection molded compositions made with biomass low color compound content microalgae differ from the mechanical and physical properties of injection molded prepared from biomass from high color compound content microalgae. Specifically, biomass from microalgae comprising low levels of color compounds, relative to those cultivated photosynthetically and or with high relative levels of color compounds, results in injection molded compositions with greater impact resistance.

In addition, injection molded composites prepared with the different microalgae differ in color as evaluated by the Hunter 1948 L, a, b color space measurement. In this system, perceived lightness, L* is on a scale 0-100. a* is a measure of the hue on the red/green axis; negative values indicate green while positive values indicate magenta. b* is a measure of hue on the yellow/blue axis; negative values indicate blue while positive values indicate yellow. By the Hunter colorimeter measurement, injection molded compositions prepared with biomass from *Prototheca moriformis* (UTEX 1435) or *Chlorella protothecoides* (UTEX 250) are lighter, are shifted to farther to the red portion of the red-green axis, and are shifted farther to the blue portion of the blue-yellow axis than are injection molded compositions prepared with biomass from *Chlorella vulgaris* or *Spirulina*.

Example 7

Thermoplastic Compositions made with Microalgal Biomass prepared with different Press Aid Materials This example describes the effects of different press aid materials used in the production of microalgal biomass to generate thermoplastic compositions with distinct mechanical properties. Genetically engineered derivatives of *Prototheca moriformis* (UTEX 1435) were cultivated under heterotrophic conditions such as those described in WO2008/151149, WO2010/063032, and WO2011/150411, dried, then mechanically pressed to extract oil. Different press aids were used in mechanical extraction as described below. Glucose was used as the carbon source in the fermentation broth for biomass samples A1 and G1. Sucrose was used as the carbon source in the fermentation broth for biomass samples H1, I1, and J1.

These five different microalgal biomass samples were prepared through pressing strains of *Prototheca moriformis* with either soybean hulls, rice hulls, or bagasse press aid added at the weight percentages listed in Table XVI. The resulting biomass preparations were milled to a final average particle size of 250-550 micrometers.

TABLE XVI

Microalgal Biomass Preparations used in
Compounding Thermoplastic Compositions

| Microalgal Biomass Sample | Press Aid | Weight % Press Aid added in extraction | Residual Oil |
|---|---|---|---|
| A1 | Soybean hull | 15 | 7.2 |
| G1 | Bagasse | 25 | 10.5 |
| H1 | Soybean hull | 30 | 8.0 |
| I1 | Rice Hull | 30 | 9.0 |
| J1 | Bagasse | 20 | 9.6 |

Thermoplastic pellets were compounded using a 26 mm co-rotating twin-screw extruder heated to 180° C. Marlex 6007 high density polyethylene resin was added at 60% by weight fed in the feed throat and microalgal biomass, added at 40% by weight, was side-stuffed downstream. Injection molded flexural and tensile test bars were generated from these pellets with an Engle 85 Injection Moulding Machine. Mechanical properties of thermoplastic samples 7-1 through 7-5 were tested according to ASTM standards. Results for each sample are presented in Table XVII.

TABLE XVII

Mechanical Properties of Injection Molded Thermoplastic Compositions
Comprising Different Microalgal Biomass Preparations

| | | Thermoplastic Samples | | | | |
|---|---|---|---|---|---|---|
| | | 7-1 | 7-2 | 7-3 | 7-4 | 7-5 |
| Microalgal Biomass Sample | | A1 | G1 | H1 | I1 | J1 |
| Tensile Strength (psi) | Average | 2080 | 2250 | 1940 | 2070 | 2070 |
| | St. Dev. | 15 | 66 | 23 | 15 | 56 |
| Elongation (%) | Average | 12.07 | 7.95 | 10.01 | 7.49 | 7.01 |
| | St. Dev. | 0.86 | 0.7 | 0.55 | 0.44 | 0.78 |
| Tensile Modulus (psi) | Average | 229000 | 317000 | 234000 | 278000 | 289000 |
| | St. Dev. | 7680 | 19600 | 11800 | 10100 | 8090 |
| Flexural Strength (psi) | Average | 3640 | 4380 | 3460 | 3920 | 4010 |
| | St. Dev. | 33 | 71 | 57 | 40 | 56 |
| Flexur Modulus (psi) | Average | 220000 | 283000 | 189000 | 224000 | 235000 |
| | St. Dev. | 2520 | 5500 | 4540 | 7550 | 6590 |
| Notched Izod (ft-lb/in) | Average | 1.39 | 1.44 | 1.72 | 1.53 | 1.54 |
| | St. Dev. | 0.09 | 0.09 | 0.16 | 0.09 | 0.12 |
| Unnotched Izod (ft-lb/in) | Average | 5.85 | 4.26 | 4.33 | 3.15 | 3.9 |
| | St. Dev. | 0.953 | 0.49 | 0.56 | 0.66 | 0.5 |

The data presented in Table XVII show that the use of different press aid materials used in preparation of the microalgal biomass can be varied to improve tensile, flexural, or impact properties of injection molded compositions prepared with microalgal biomass.

The result of pressing microalgae with soybean hulls to extract oil, in contrast to pressing with rice hulls or bagasse, is a microalgal biomass that imparts greater elongation and impact resistance to a thermoplastic composition. Among the samples listed in Table XVII, materials produced from microalgal biomass pressed with soybean hulls have the greatest elongation, notched Izod, and unnotched Izod values. The result of pressing microalgae with rice hulls or bagasse to extract oil, in contrast to pressing with soybean hulls, is a microalgal biomass that imparts greater tensile and flexural strength and modulus to a thermoplastic composition. Among the samples listed in Table XVII, materials produced from microalgal biomass pressed with bagasse have the highest tensile and flexural strength and modulus.

This example demonstrates that distinct press aid materials were used to improve the mechanical properties of injection molded thermoplastic compositions comprising microalgal biomass.

Example 8

Injection Molded Compositions Comprising Triglyceride Oil and Microalgal Biomass This example describes the use of triglyceride oil and microalgal biomass and to produce thermoplastic compositions with distinct mechanical properties. A genetically engineered derivative of *Prototheca moriformis* (UTEX 1435) was cultivated under heterotrophic conditions such as those described in WO2008/151149, WO2010/063032, and WO2011/150411, dried, then mechanically pressed to extract oil. Sucrose was used as the carbon source in the fermentation broth. Microalgal biomass sample E1 was prepared through pressing *Prototheca moriformis* with soybean hulls added at 30% by weight. The resulting microalgal biomass with soybean hull plant polymers retained 6.5% residual oil. The resulting biomass preparation was milled to a final average particle size of 400 micrometers. Where indicated, triglyceride oil was added, then mixed with microalgal biomass sample E1 to increase the amount of oil in the microalgal biomass.

Thermoplastic pellets of the weight-based formulations corresponding to the samples in Table XVIII were compounded using a 26 mm co-rotating twin-screw extruder heated to 180° C. with resin fed in the feed throat and microalgal biomass side-stuffed downstream. Injection molded test bars were generated from these pellets with an Engle 85 Injection Moulding Machine. Mechanical properties were tested according to ASTM standards. Results for each sample are presented in Table XIX.

TABLE XVIII

Microalgal Biomass formulations used in compounding thermoplastic compositions

| | Weight Percent | | | |
|---|---|---|---|---|
| Sample | Microalgal Biomass | Marlex 6007 HDPE | Ineos H35G-00PP PP | High Oleic Triglyceride Oil |
| 8-1 | 40 | 60 | 0 | 0 |
| 8-2 | 39 | 60 | 0 | 1 |
| 8-3 | 37.6 | 60 | 0 | 2.4 |
| 8-4 | 36.8 | 60 | 0 | 3.2 |
| 8-5 | 40 | 0 | 60 | 0 |
| 8-6 | 39 | 0 | 60 | 1 |
| 8-7 | 37.6 | 0 | 60 | 2.4 |
| 8-8 | 36.8 | 0 | 60 | 3.2 |

TABLE XIX

Mechanical Properties of Injection Molded Thermoplastic Compositions Comprising Microalgal Biomass

| | | Sample Number | | | | | | | |
|---|---|---|---|---|---|---|---|---|---|
| | | 8-1 | 8-2 | 8-3 | 8-4 | 8-5 | 8-6 | 8-7 | 8-8 |
| Tensile Strength (psi) | Average | 2090 | 2080 | 2020 | 2000 | 2530 | 2340 | 2330 | 2290 |
| | St. Dev. | 15 | 10 | 41 | 18 | 23 | 26 | 14 | 26 |
| Elongation (%) | Average | 10.21 | 11.73 | 12.74 | 11.97 | 3.26 | 4.38 | 4.66 | 4.97 |
| | St. Dev. | 1.4 | 0.35 | 1.24 | 0.95 | 0.1 | 0.23 | 0.4 | 0.2 |
| Tensile Modulus (psi) | Average | 263000 | 242000 | 223000 | 220000 | 352000 | 298000 | 307000 | 301000 |
| | St. Dev. | 11900 | 14100 | 5800 | 14200 | 12100 | 14800 | 15200 | 20200 |
| Flexural Strength (psi) | Average | 3790 | 3670 | 3370 | 3200 | 5120 | 4760 | 4700 | 4660 |
| | St. Dev. | 74 | 43 | 38 | 40 | 43 | 52 | 82 | 41 |
| Flexural Modulus (psi) | Average | 228000 | 219000 | 196000 | 184000 | 296000 | 263000 | 262000 | 252000 |
| | St. Dev. | 11600 | 3680 | 3920 | 5450 | 3610 | 3330 | 4360 | 3480 |
| Notched Izod (ft-lb/in) | Average | 1.445 | 1.460 | 1.565 | 1.603 | 0.349 | 0.327 | 0.346 | 0.327 |
| | St. Dev. | 0.081 | 0.057 | 0.086 | 0.069 | 0.020 | 0.000 | 0.021 | 0.037 |
| Unnotched Izod (ft-lb/in) | Average | 2.117 | 2.490 | 2.690 | 3.223 | 0.953 | 1.288 | 1.251 | 1.625 |
| | St. Dev. | 0.314 | 0.264 | 0.386 | 0.606 | 0.059 | 0.218 | 0.177 | 0.164 |

The data presented in Table XIX show that the mechanical properties of injection molded compositions prepared with microalgal biomass can be altered through increasing the oil content of the microalgal biomass.

The result of adding triglyceride oil to microbial biomass sample E1 prior to compounding and extrusion was an increase in the elongation and in the impact resistance of injection molded parts made with the compounded microalgal biomass. In high density polyethylene, elongation improved from about 10% (Sample 8-1) to about 13% (Sample 8-3) as a result of mixing additional triglyceride oil into microalgal biomass E1. In polypropylene, elongation improved from about 3% (Sample 8-5) to about 5% (Sample 8-8) as a result of mixing additional triglyceride oil into microalgal biomass E1. In high density polyethylene, notched Izod improved from about 1.445 ft-lb/in (Sample 8-1) to about 1.603 ft-lb/in (Sample 8-4) and unnotched Izod improved from about 2.117 ft-lb/in (Sample 8-1) to about 3.223 ft-lb/in (Sample 8-4) as a result of mixing additional triglyceride oil into microalgal biomass E1. In polypropylene, unnotched Izod improved from about 0.953 ft-lb/in (Sample 8-5) to about 1.625 ft-lb/in (Sample 8-8) as a result of mixing additional triglyceride oil into microalgal biomass E1.

This example demonstrates the successful use of added triglyceride oil to microalgal biomass to improve the mechanical properties of injection molded thermoplastic compositions.

Example 9

This example describes the detection of volatile compounds from thermoplastic compositions prepared with different microalgal biomass samples. Injection molded tensile bars were produced according the weight percentages listed in Table XX using the methods outlined in Examples 6, 7, and 8. The microalgal biomass samples utilized in generating these compositions were described in Examples 4 through 8.

TABLE XX

Weight percent formulations

| Injection Molded Tensile Bar Sample | Weight % HDPE | Weight % Microalgal Biomass | Biomass Type |
|---|---|---|---|
| 9-1 | 100 | 0 | None |
| 9-2 | 60 | 40 | *Chlorella vulgaris* |
| 9-3 | 60 | 40 | *Spirulina* |
| 9-4 | 60 | 40 | D1 |
| 9-5 | 60 | 40 | C1 |
| 9-6 | 60 | 40 | I1 |
| 9-7 | 60 | 40 | H1 |
| 9-8 | 60 | 40 | J1 |

The different tensile bar samples were characterized by different odors and aromas. Sample 9-2 was characterized as having a musty, earthy, damp, and fishy smell. Sample 9-3 was characterized by grassy, barny, smoky, and seaweed odors. In contrast, Samples 9-4 through 9-8 were characterized by malty, sweet, toasty, caramel, burnt popcorn, and cotton candy odors.

Each tensile bar was subjected to volatile analysis through a process of extraction and detection by GC-MSD. All injections were splitless. Peak identification was based on comparison of EI mass spectra in samples to EI mass spectra of the NIST Library. Data reported are as relative concentration compared to the internal standard expressed in ppb.

The total list of detected compounds across Samples 9-1 through 9-8 was evaluated for those uniquely present in thermoplastic samples prepared with *Chlorella vulgaris* or *Spirulina* biomass (Table XXI) and for those uniquely present in thermoplastic samples prepared with *Prototheca moriformis* (UTEX 1435) biomass (Table XXII). Compounds listed in Table 10X were not detected from thermoplastic samples prepared with *Prototheca moriformis* (UTEX 1435) biomass. The minimum and maximum detected levels reported in the tables below are in units of parts per billion, determined relative to a 2-undecanone internal standard. CAS numbers for the compounds are listed.

TABLE XXI

Compounds detected from injection molded compositions prepared with *Chlorella vulgaris* or *Spirulina* biomass

| Compounds | CAS | Min (ppb) | Max (ppb) |
|---|---|---|---|
| 2-Butanone | 78-93-3 | 40.8 | 59 |
| Butanal, 2-methyl- | 96-17-3 | 32.3 | 38.7 |
| Disulfide, dimethyl | 624-92-0 | 20.9 | 56.8 |
| Toluene | 108-88-3 | 379.9 | 593.6 |
| Pyridine, 2-methyl- | 109-06-8 | 35.4 | 202.2 |
| 1H-Pyrrole, 2-methyl- | 636-41-9 | 31 | 35.6 |
| 1H-Pyrrole, 3-methyl- | 616-43-3 | 10.5 | 24.3 |
| Pyridine, 3-methyl- | 108-99-6 | 110.8 | 121.5 |
| Pyridine, 2,6-dimethyl- | 108-48-5 | 3.3 | 6.2 |
| Thiazole, 2,4-dimethyl- | 541-58-2 | 7.9 | 30 |
| 1-Butylpyrrolidine | 767-10-2 | 18.4 | 85.6 |
| Butanal, 2-ethyl- | 97-96-1 | 21.8 | 50.6 |
| Pyrazine, 2,5-dimethyl- | 123-32-0 | 831.5 | 1224 |
| Pyrazine, ethyl- | 13925-00-3 | 17.1 | 161.9 |
| Pyrazine, 2,3-dimethyl- | 5910-89-4 | 67.6 | 152.1 |
| Pyridine, 2,4-dimethyl- | 108-47-4 | 15 | 67.4 |
| 1-Octen-3-ol | 3391-86-4 | 14.1 | 181.2 |
| 5-Hepten-2-one, 6-methyl- | 110-93-0 | 100.6 | 120.7 |
| 2-Octanone | 111-13-7 | 32.3 | 188.9 |
| Pyrazine, trimethyl- | 14667-55-1 | 530 | 853 |
| 2-Cyclohexen-1-one, 3,5,5-trimethyl- | 78-59-1 | 39.9 | 425.3 |
| Pyrazine, 2-ethyl-3,5-dimethyl- | 18138-04-0 | 132.7 | 443.4 |
| 2-Cyclohexen-1-one, 3,5,5-trimethyl- | 78-59-1 | 11.7 | 12.1 |
| Pyrazine, 2,3-diethyl-5-methyl- | 18138-04-0 | 1.5 | 84.7 |
| Pyrazine, 3,5-diethyl-2-methyl- | 18138-05-1 | 98.1 | 102.7 |
| Pyrazine, 2-methyl-5-(1-propenyl)-, (E)- | 18217-82-8 | 54.1 | 275.2 |
| 1-Cyclohexene-1-carboxaldehyde, 2,6,6-trimethyl- | 432-25-7 | 42.1 | 230 |
| Octadecane, 6-methyl- | #N/A | 35.7 | 40.3 |
| Ionone | 127-41-3 | 44 | 338.6 |
| Geranyl acetone | 3796-70-1 | 356.8 | 693.7 |
| 2(4H)-Benzofuranone,5,6,7,7a-tetrahydro-4,4,7a-trimethyl- | 17092-92-1 | 55 | 1379 |

TABLE XXII

Compounds detected from injection molded compositions prepared with *Prototheca moriformis* (UTEX 1435) biomass

| Compound | CAS | Min | Max |
|---|---|---|---|
| 2,3-Butanedione | 431-03-8 | 9.9 | 204.7 |
| Acetoin | 513-86-0 | 28.1 | 402.2 |
| 3(2H)-Furanone, dihydro-2-methyl- | 3188-00-9 | 32.8 | 652.6 |
| Butanoic acid, 3-methyl- | 503-74-2 | 3.2 | 151.5 |
| Furan, 2-acetyl- | 1192-62-7 | 29.2 | 691.1 |
| Butyrolactone | 96-48-0 | 225.2 | 793.1 |
| 2-Cyclopenten-1-one, 2-hydroxy- | 10493-98-8 | 37.9 | 341.3 |
| 2(5H)-Furanone, 5-methyl- | 591-11-7 | 39.4 | 296.6 |

TABLE XXII-continued

Compounds detected from injection molded compositions prepared with *Prototheca moriformis* (UTEX 1435) biomass

| Compound | CAS | Min | Max |
|---|---|---|---|
| 2-Furanmethanol, 5-methyl- | 3857-25-8 | 16.9 | 523.9 |
| Isomaltol | 3420-59-5 | 5.7 | 40.6 |
| o-Cresol | 95-48-7 | 1.0 | 43.1 |
| Furaneol | 3658-77-3 | 38.2 | 868.4 |
| Furyl hydroxymethyl ketone | 17678-19-2 | 119.6 | 397.2 |
| Nonanal | 124-19-6 | 86.7 | 317.5 |
| o-Guaiacol | 90-05-1 | 3.3 | 116.9 |
| Maltol | 118-71-8 | 1088.2 | 2739.4 |
| Bis(2-furfuryl)disulfide | 4437-20-1 | 99.1 | 658.4 |
| HMF | 67-47-0 | 967.1 | 3662.3 |
| Nonanoic acid | 112-05-0 | 57.8 | 131.3 |
| 2',6'-Dihydroxyacetophenone | 699-83-2 | 48.7 | 1451.7 |
| 5-Acetoxymethyl-2-furaldehyde | 10551-58-3 | 64.4 | 190.1 |
| n-Decanoic acid | 334-48-5 | 7.6 | 171.8 |
| 4H-Pyran-4-one, 2,3-dihydro-3,5-dihydroxy-6-methyl- | 28564-83-2 | Nd | 9571.0 |

Thermoplastic compositions prepared with microalgal biomass from *Chlorella vulgaris* or *Spirulina* are characterized by nitrogenous compounds such as pyridines, pyrazines, pyrroles, and pyrrolidines. Thermoplastic compositions prepared with microalgal biomass from *Prototheca moriformis* (UTEX 1435) lack these nitrogenous compounds and are, in contrast, characterized by furan and alcohol compounds.

Example 10

Injection Molded Polypropylene Compositions Comprising Glass Fiber and Microalgal Biomass This example describes the use of microalgal biomass and glass fiber and to produce thermoplastic compositions with desirable mechanical properties. Thermoplastic pellets of formulations corresponding to the samples in Table XXIII were compounded using a 26 mm co-rotating twin-screw extruder heated to 180° C. with 35G-00 polypropylene homopolymer (INEOS Olefins & Polymers USA) fed in the feed throat and microalgal biomass and Thermoflow 738 4 mm glass fiber side-stuffed downstream. Microalgal biomass D1, described in Example 5, was used in these thermoplastic samples. Injection molded flexural and tensile test bars were generated from these pellets with an Engle 85 Injection Moulding Machine. Mechanical properties were tested according to ASTM standards. Results for each sample are presented in Table XXIV.

TABLE XXIII

Weight percent formulations

| | Weight % | | |
|---|---|---|---|
| Sample | Microalgal Biomass D1 | Ineos 35G-00 homopolymer | Glass Fiber |
| 10-1 | 0 | 70 | 30 |
| 10-2 | 5 | 65 | 30 |
| 10-3 | 10 | 60 | 30 |
| 10-4 | 20 | 50 | 30 |

TABLE XXIV

Mechanical and Physical Properties of Injection Molded Thermoplastic Compositions Comprising Microalgal Biomass and Glass Fiber

| | | Injection Molded Thermoplastic Sample | | | |
|---|---|---|---|---|---|
| | | 10-1 | 10-2 | 10-3 | 10-4 |
| Tensile Strength (psi) | Average | 5440 | 4020 | 3800 | 3140 |
| | St. Dev. | 48 | 55 | 116 | 36 |
| Elongation (%) | Average | 2.27 | 2.22 | 1.36 | 1.16 |
| | St. Dev. | 0.07 | 0.07 | 0.07 | 0.06 |
| Tensile Modulus (psi) | Average | 700000 | 764000 | 812000 | 860000 |
| | St. Dev. | 28800 | 89300 | 81000 | 82900 |
| Flexural Strength (psi) | Average | 9720 | 7760 | 7090 | 6210 |
| | St. Dev. | 103 | 123 | 137 | 147 |
| Flexural Modulus (psi) | Average | 579000 | 597000 | 623000 | 680000 |
| | St. Dev. | 13300 | 16500 | 9630 | 14000 |
| Notched Izod (ft-lb/in) | Average | 0.49 | 0.5 | 0.54 | 0.54 |
| | St. Dev. | 0.02 | 0.03 | 0.02 | 0.02 |
| Unnotched Izod (ft-lb/in) | Average | 3.91 | 3.62 | 2.8 | 2.07 |
| | St. Dev. | 0.23 | 0.16 | 0.21 | 0.32 |
| Specific Gravity | Average | 1.13 | 1.14 | 1.16 | 1.2 |
| | St. Dev. | 0 | 0 | 0.01 | 0.01 |

The data presented in Table XIV show that the flexural and tensile modulus of glass fiber filled injection molded compositions prepared with microalgal biomass are comparable or improved relative to those of injection molded parts lacking microalgal biomass.

This example demonstrates the successful use of microalgal biomass to lower the amount of thermoplastic resin in a glass filled composite while improving specific mechanical properties.

Example 11

Improved Impact Strength of Thermoplastic Compositions Prepared with Microalgal Biomass This example describes the use of biomass prepared from microalgae to produce thermoplastic compositions with improved impact strength. *Prototheca moriformis* (UTEX 1435) was cultivated under heterotrophic conditions such as those described in WO2008/151149, WO2010/063032, and WO2011/150411, dried, then mechanically pressed to extract oil. D1 and F1 microalgal biomass preparations were obtained through alterations in processing, oil extraction, and milling conditions. Preparation D1 was described in Example 5. Sucrose was used as the carbon source in the fermentation through which Preparation F1 was generated; following drying microalgal biomass was mechanically pressed with soybean hulls added at 30% by weight to extract oil. F1 was characterized by 9% residual oil.

D1 and F1 were milled to a final average particle size of 250-425 micrometers then compounded with polypropylene copolymer (ExxonMobil PP7033N), 0.25% by weight anti-oxidant, 2% by weight coupling agent, and 10% by weight elastomer. Weight percentages of microalgal biomass and polypropylene copolymer are shown in Table XXV. Compounding was conducted with a 26 mm co-rotating twin-screw extruder with resin fed in the feed throat and microalgal biomass side-stuffed downstream. Injection molded test bars were generated with an Engle 85 Injection Moulding Machine. Mechanical properties of the compositions were tested according to ASTM standards. Results from these tests are shown in Table XXV.

TABLE XXV

Formulations and Mechanical Properties of Injection Molded Compositions

| | | Weight % in Formulation | | Notched Izod (ft-lb/in) | | Un-Notched (ft-lb/in) | |
|---|---|---|---|---|---|---|---|
| Microalgal Biomass | Sample | % Macroalgal Biomass | % ExxonMobil PP7033N | Average | St. Dev. | Average | St. Dev. |
| D1 | 11-1 | 15 | 72.75 | 3.829 | 0.275 | 13.195 | 0.844 |
| | 11-2 | 20 | 67.75 | 3.268 | 0.246 | 10.609 | 1.710 |
| | 11-3 | 25 | 62.75 | 2.966 | 0.132 | 9.793 | 0.975 |
| | 11-4 | 30 | 57.75 | 2.605 | 0.137 | 7.055 | 0.987 |
| | 11-5 | 40 | 47.75 | 2.200 | 0.207 | 4.784 | 0.672 |
| F1 | 11-6 | 15 | 72.75 | 2.966 | 0.201 | 10.384 | 1.921 |
| | 11-7 | 20 | 67.75 | 2.406 | 0.233 | 8.852 | 2.067 |
| | 11-8 | 25 | 62.75 | 2.116 | 0.167 | 7.322 | 0.798 |
| | 11-9 | 30 | 57.75 | 1.919 | 0.082 | 6.518 | 0.603 |
| | 11-10 | 40 | 47.75 | 1.475 | 0.096 | 4.788 | 1.529 |

As shown in Table XXV, different microalgal biomass preparations are associated with different thermoplastic composition mechanical properties. Formulations with 30% D1 and 57.75% polypropylene copolymer were characterized by a Notched Izod of about 2.6 ft-lb/in. Formulations with 20% D1 and 67.75% polypropylene copolymer were characterized by a Notched Izod of greater than about 3.2 ft-lb/in.

Example 12

Melt Flow Indexes

This example describes the use of biomass prepared from microalgae to produce thermoplastic compositions with desired impact strength in polypropylene copolymers (PP-cPs) that differ in melt flow rates. Microalgal biomass D1, described in Example 5, was blended and extruded with polypropylene copolymer, 0.25% by weight antioxidant, 2% by weight coupling agent, and 10% by weight elastomer as described in Example 11. Three distinct polypropylene copolymers differing in molecular weight and as a result, differing in melt flow index (MFI), were compounded with microalgal biomass D1 according to the weight percentage formulations listed in Table XXVI. ExxonMobil PP7033N had an MFI of 8 g/10 minutes, Lyondell Basell Profax SG702PP had an MFI of 18 g/10 minutes, and Lyondell Basell SG899 PP had an MFI of 35 g/10 minutes. Compounding was conducted with a 26 mm co-rotating twin-screw extruder with resin fed in the feed throat and microalgal biomass side-stuffed downstream. Injection molded test bars were generated with an Engle 85 Injection Moulding Machine. Mechanical properties of the compositions were tested according to ASTM standards. Results from these tests are shown in Table XXVI.

TABLE XXVI

Formulations and Mechanical Properties of Injection Molded Compositions

| Sample | % D1 Microalgal Biomass | % PPcP | PPcP MFI | Notched Izod (ft-lb/in) Average | St. Dev. | Un-Notched (ft-lb/in) Average | St. Dev. |
|---|---|---|---|---|---|---|---|
| 12-1 | 20 | 67.75 | 8 | 3.2678 | 0.2456 | 10.6088 | 1.710 |
| 12-2 | 30 | 57.75 | 8 | 2.6046 | 0.137 | 7.0546 | 0.987 |
| 12-3 | 20 | 67.75 | 18 | 3.3948 | 0.515 | 9.3388 | 1.059 |
| 12-4 | 30 | 57.75 | 18 | 2.5598 | 0.157 | 6.5162 | 1.053 |
| 12-5 | 20 | 67.75 | 35 | 3.8982 | 0.368 | 9.542 | 0.804 |
| 12-6 | 30 | 57.75 | 35 | 2.589 | 0.297 | 6.4234 | 0.697 |

As shown in Table XXVI, the formulations with 30% D1 and 57.75% polypropylene copolymer were characterized by a Notched Izod value of about 2.6 ft-lb/in. Formulations with 20% D1 and 67.75% polypropylene copolymer were characterized by a Notched Izod value of greater than about 3.2 ft-lb/in. These results demonstrate that injection molded compositions exhibiting desired impact strength properties may be produced with microalgal biomass and distinct molecular weight polypropylene copolymers.

Example 13

Masterbatch Compositions Prepared with Microalgal Biomass

This example describes the production of masterbatch compositions prepared with microalgal biomass to produce injection molded thermoplastic articles with desired mechanical and physical properties. Masterbatch compositions of microalgal biomass D1 (described in Example 5), polypropylene copolymer, antioxidant, coupling agent, and elastomer were compounded with a twin screw according to the weight-based formulations listed in Table XXVII.

TABLE XXVII

Weight Percent Formulation of Masterbatch Pellets

| D1 Microalgal Biomass | Coupling Agent | Antioxidant | Elastomer | PPcP |
|---|---|---|---|---|
| 66.7 | 4.4 | .6 | 22.2 | 6.1 |

The pelletized masterbatch sample described in Table XXVII was then let down by injection molding with added polypropylene copolymer pellets to match the weight based formulations listed in Example 12, Table XXVI. Specifically, 45% by weight masterbatch sample was combined with 55% by weight of the three different polypropylene copolymer resins listed in Table XXVI. Injection molded test bars were generated with an Engle 85 Injection Moulding Machine. Mechanical properties of the compositions were tested according to ASTM standards. Results from these tests are shown in Table XXVII.

TABLE XXVII

Formulations and Mechanical Properties of Injection Molded Compositions

| Sample | % Microalgal Masterbatch | % PPcP | PPcP MFI | Notched Izod (ft-lb/in) Average | St. Dev. | Un-Notched (ft-lb/in) Average | St. Dev. |
|---|---|---|---|---|---|---|---|
| 12-1 | 45 | 55 | 8 | 3.04 | 0.15 | 6.59 | 0.93 |
| 12-3 | 45 | 55 | 18 | 2.85 | 0.26 | 6.34 | 1.30 |
| 12-6 | 45 | 55 | 35 | 2.95 | 0.44 | 7.13 | 0.57 |

As shown in Table XXVII, injection molded forms produced from microalgal masterbatch and different molecular weight polypropylene copolymers were characterized by Notched Izod values of about 2.85, 2.95, and 3.04 ft-lb/in. These results demonstrate that injection molded compositions exhibiting desired impact strength properties were produced with masterbatch compositions prepared with high concentrated levels of microalgal biomass.

Example 14

Masterbatch Compositions Prepared with Microalgal Biomass

This example describes the production of masterbatch compositions prepared with microalgal biomass to produce injection molded thermoplastic articles and wherein the physical and mechanical properties of the compositions prepared through masterbatch are comparable to those produced through direct formulation compounding and injection molding. Masterbatch compositions of microalgal biomass D1 (described in Example 5) and C1 (described in Example 2) and high density polyethylene (Marlex 6007) were compounded with a twin screw according to the weight-based formulations listed in Table XVIII.

TABLE XXVIII

Weight Percent Formulation of Masterbatch Pellets

| Masterbatch | Microalgal Biomass | % Microalgal Biomass | % HDPE |
|---|---|---|---|
| 13-1 | D1 | 80 | 20 |
| 13-2 | C1 | 80 | 20 |

The pelletized masterbatch samples were then let down by injection molding with added high density polyethylene pellets to match the weight based formulations listed in Example 8, Table XVIII. Specifically, 50% by weight masterbatch sample was combined with 50% by weight of HDPE pellets. Injection molded test bars were generated with an Engle 85 Injection Moulding Machine. Mechanical properties of the compositions were tested according to ASTM standards. Results from these tests are shown in Table XXIX.

TABLE XXIX

Formulations and Mechanical Properties of Injection Molded Compositions

|  |  | Direct Formulation |  | Masterbatch |  |
| --- | --- | --- | --- | --- | --- |
|  |  | Biomass D1 | Biomass C1 | Biomass D1 | Biomass C1 |
| Tensile Strength (psi) | Average | 2300 | 2350 | 2010 | 2020 |
|  | St. Dev. | 33 | 10.5 | 63.3 | 31.1 |
| Elongation (%) | Average | 10.5 | 8.8144 | 8.25 | 9.67 |
|  | St. Dev. | 1.21 | 1.050 | 1.32 | 1.01 |
| Tensile Modulus (psi) | Average | 247000 | 236000 | 280000 | 229000 |
|  | St. Dev. | 29400 | 11500 | 35000 | 185000 |
| Flexural Strength (psi) | Average | 3470 | 3880 | 3700 | 3920 |
|  | St. Dev. | 58 | 48 | 93.5 | 49.5 |
| Flexural Modulus (psi) | Average | 221000 | 230000 | 210000 | 221000 |
|  | St. Dev. | 7190 | 6200 | 8960 | 6930 |
| Notched Izod (ft-lb/in) | Average | 1.42 | 1.4624 | 1.24 | 1.07 |
|  | St. Dev. | 0.07 | 0.074 | 0.07 | 0 |
| Unnotched Izod (ft-lb/in) | Average | 5.03 | 4.9158 | 3.94 | 4.16 |
|  | St. Dev. | 0.89 | 0.808 | 0.35 | 0.54 |
| Specific Gravity | Average | 1.06 | 1.04 | 1.11 | 1.09 |
|  | St. Dev. | 0.01 | 0.00 | 0.01 | 0.00 |

These results demonstrate that injection molded compositions may be prepared through a masterbatch format, comprising microalgal biomass at 80% weight, to achieve comparable mechanical performance to that of injection molded compositions formulated with directly with lower levels of microalgal biomass.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A wood plastic composite comprising a blend of:
a) a thermoplastic resin;
b) a cellulosic filler selected from the group consisting of wood fiber, rice hull, bamboo, soy hull, switchgrass, rice straw, sugar beet pulp, sugar cane bagasse, dry rosemary, corn stover, delipidated cake from soybean, canola, cottonseed, sunflower, jatropha seeds, paper pulp and waste paper;
c) oleaginous microbial cells extracted of triglycerides yielding de-fatted biomass;
d) optionally wood product composite lubricant;
wherein the wood plastic composite comprises a reduced or eliminated amount of the wood product composite lubricant and maintains an equivalent appearance profile as compared to a wood plastic composite containing the wood product composite lubricant but lacking the biomass.

2. The composite of claim 1 wherein the resin is selected from the group consisting of a polyolefin, polyvinyl chloride, polylactic acid, and polymethyl methacrylate resin.

3. The composite of claim 2 wherein the polyolefin is polyethylene or polypropylene.

4. The composite of claim 1, wherein the coupling agent is a silane or a maleic anhydride grafted polyolefin.

5. The composite of claim 1, wherein the biomass is chemically modified.

6. The composite of claim 5, wherein the biomass is acylated.

7. The composite of claim 6, wherein the biomass is acetylated.

8. The composite of claim 1, wherein the biomass has an average particle size of from 0.1 to 500 microns.

9. The composite of claim 8, wherein the biomass has an average particle size about 350 microns.

10. The composite of claim 1, wherein the biomass is obtained from an oleaginous bacteria, yeast, or microalgae.

11. The composite of claim 10, wherein the biomass is obtained from a heterotrophic oleaginous microalgae.

12. The composite of claim 1, wherein the biomass is obtained from *Parachlorella*, *Prototheca*, or *Chlorella*.

13. The composite of claim 12, wherein the biomass obtained from *Prototheca moriformis*.

14. The composite of claim 1, wherein the oleaginous microbe has a fatty acid profile of at least 60% C18:1; or at least 50% combined total amount of C10, C12, and C14; or at least 70% combined total amount of C16:0 and C18:1.

15. The composite of claim 1, wherein the oleaginous microbe has a fatty acid profile of at least 80-85% C18:1.

16. The composite of claim 1, wherein the oleaginous microalgae has a fatty acid profile of less than 1% or 0.1% polyunsaturated fatty acids.

17. The composite of claim 1, wherein the oleaginous microbe comprises up to 1, 2, 3, 4, 5, 6, 7, 8, 9, 10, 11, 12, 13, 14,or 15% by weight of the composite.

18. The composite of claim 1 that is free from metal stearates not derived from an oleaginous microbe.

19. The composite of claim 18 that is free from zinc stearate not derived from an oleaginous microbe.

20. An article comprising the wood plastic composite of claim 1, wherein the article is selected from the group consisting of flooring material, outdoor decking, wood paneling, window framing material, interior trim material, railing, fencing, and an automotive part.

21. A method for preparing a wood plastic composite, the method comprising
a) admixing oleaginous microbial cells extracted of triglycerides to yield a de-fatted biomass with a thermoplastic resin, and a cellulosic filler selected from the group consisting of wood fiber, rice hull, bamboo, soy hull, switchgrass, rice straw, sugar beet pulp, sugar cane bagasse, dry rosemary, corn stover, delipidated cake from soybean, canola, cottonseed, sunflower, jatropha seeds, paper pulp and waste paper, to form a mixture, wherein the mixture optionally comprises a wood product composite lubricant; and
b) extruding, injection molding, or calendaring said mixture to form the wood plastic composite, wherein the mixture comprises a reduced or eliminated amount of the wood product composite lubricant and maintains an equivalent profile as compared to a wood plastic composite containing the wood product composite lubricant but lacking the biomass.

22. The method of claim 21, wherein the de-fatted oleaginous microbial biomass is solvent-extracted, delipidated biomass.

23. The method of claim 1, wherein the wood product composite lubricant is a metal stearate or ethylene bis-stearamide (EBS).

24. The method of claim 23, wherein the wood product composite lubricant is a zinc stearate.

25. The method of claim 21, wherein the wood product composite lubricant is a metal stearate or ethylene bis-stearamide (EBS).

26. The method of claim 25, wherein the wood product composite lubricant is a zinc stearate.

* * * * *